US006971525B2

(12) United States Patent
Kirker et al.

(10) Patent No.: US 6,971,525 B2
(45) Date of Patent: *Dec. 6, 2005

(54) CENTRIFUGE WITH COMBINATIONS OF MULTIPLE FEATURES

(75) Inventors: Curtis Kirker, Kamuela, HI (US); Berkeley F. Fuller, Kamuela, HI (US)

(73) Assignee: Phase Inc., Kamuela, HI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/876,167

(22) Filed: Jun. 24, 2004

(65) Prior Publication Data

US 2004/0262213 A1 Dec. 30, 2004

Related U.S. Application Data

(60) Provisional application No. 60/483,275, filed on Jun. 25, 2003.

(51) Int. Cl.[7] ............................ B04B 1/04; B04B 1/12; B04B 7/12; B01D 17/038; B01D 21/26
(52) U.S. Cl. ................... 210/384; 210/360.1; 210/377; 210/380.1; 210/388; 494/1; 494/4; 494/36; 494/44; 494/47; 494/56; 494/60; 494/82
(58) Field of Search ................... 210/232, 360.1, 210/377, 380.1, 388, 781, 785, 384; 494/36, 494/37, 44, 47, 56, 60, 1, 4, 82

(56) References Cited

U.S. PATENT DOCUMENTS

| 2,028,168 A | | 1/1936 | Roberts |
| 2,538,529 A | * | 1/1951 | Komline ............... 494/4 |
| 2,664,905 A | * | 1/1954 | Harstick ............... 494/4 |
| 2,688,437 A | | 9/1954 | Monnet |
| 3,327,401 A | | 6/1967 | Stamos et al. |
| 3,622,003 A | | 11/1971 | Czech et al. ........... 210/108 |
| 3,937,317 A | | 2/1976 | Fleury, Jr. |
| 3,940,056 A | | 2/1976 | Schmidt |
| 3,960,318 A | | 6/1976 | Dahlberg |
| 3,961,746 A | | 6/1976 | Werner |

(Continued)

FOREIGN PATENT DOCUMENTS

DE 1632324 10/1970 ............ B04B 3/20

(Continued)

OTHER PUBLICATIONS

English Abstract from the Patent Abstracts of Japan along with a Machine Translation of the rest of the specification of Patent Publication No. JP 2001113204 A. JP 2001113204 A was published on Apr. 2001.*

(Continued)

*Primary Examiner*—David A. Reifsnyder
(74) *Attorney, Agent, or Firm*—Baker Botts L.L.P.

(57) ABSTRACT

A centrifuge with combinations of multiple features is disclosed. In one aspect, a centrifuge for removing more dense material from a fluid medium includes a fluid separation wall placed within a sleeve. The fluid separation wall rotates around the axis of rotation. A receptacle aids in separation of the more dense material from the fluid medium. The receptacle defined in a part by a respective geometry and a respective shape. An opening extends from the void area to the outer surface to transport the more dense material to the containment zone. An excitation apparatus associated with the receptacle creates a vibration within the receptacle. The centrifuge may further include a valve ring including a valve orifice the valve ring having a first position which blocks the more dense material from exiting the receptacle and a second position that allows the more dense material to move into the containment zone.

31 Claims, 22 Drawing Sheets

U.S. PATENT DOCUMENTS

| | | | | |
|---|---|---|---|---|
| 3,967,778 | A | 7/1976 | Hunwick | |
| 3,977,515 | A | 8/1976 | Lewoczko | |
| 4,005,817 | A | 2/1977 | Charlton | |
| 4,015,773 | A | 4/1977 | Thylefors | |
| 4,027,820 | A | 6/1977 | Kulker | |
| 4,067,494 | A | 1/1978 | Willus | |
| 4,070,290 | A | 1/1978 | Crosby | 210/91 |
| 4,083,488 | A | 4/1978 | Gunnewig | |
| 4,103,822 | A | 8/1978 | Stroucken | |
| 4,149,668 | A | 4/1979 | Zurbruggen | |
| 4,164,317 | A | 8/1979 | Nelson | |
| 4,251,023 | A | 2/1981 | Hohne | |
| 4,253,962 | A | 3/1981 | Thompson | 210/414 |
| 4,288,029 | A | 9/1981 | Epper et al. | |
| 4,298,162 | A | 11/1981 | Hohne | |
| 4,311,270 | A | 1/1982 | Hovstadius | |
| 4,331,270 | A | 5/1982 | Humlong | |
| 4,343,431 | A | 8/1982 | Wehling | |
| 4,375,870 | A | 3/1983 | Bodelson | 494/40 |
| 4,379,976 | A | 4/1983 | Pitchford | 310/83 |
| 4,381,849 | A | 5/1983 | Conant | 494/43 |
| 4,410,319 | A | 10/1983 | Zettier et al. | 494/29 |
| 4,430,221 | A | 2/1984 | Spiewok | 210/380.1 |
| 4,490,133 | A | 12/1984 | Zettier | 494/27 |
| 4,504,262 | A | 3/1985 | Forsberg | 494/53 |
| 4,505,697 | A | 3/1985 | Lee et al. | 494/35 |
| 4,514,183 | A | 4/1985 | Kohlstette | 494/27 |
| 4,519,496 | A | 5/1985 | Ludvigsen | 198/676 |
| 4,543,083 | A | 9/1985 | Bounds | 494/4 |
| 4,569,761 | A | 2/1986 | Spiewok et al. | 210/380.1 |
| 4,581,896 | A | 4/1986 | Andresen et al. | 60/487 |
| 4,629,564 | A | 12/1986 | Pinato | 210/512 |
| 4,643,709 | A | 2/1987 | Lee et al. | 494/37 |
| 4,645,485 | A | 2/1987 | Niemerg | 494/27 |
| 4,698,053 | A | 10/1987 | Stroucken | 494/70 |
| 4,701,158 | A | 10/1987 | Inge et al. | 494/74 |
| 4,707,259 | A | 11/1987 | Doucet | 210/351 |
| 4,710,159 | A | 12/1987 | Gullers | 494/27 |
| 4,717,376 | A | 1/1988 | Bruning et al. | 494/40 |
| 4,721,505 | A | 1/1988 | Inge et al. | 494/74 |
| 4,729,759 | A | 3/1988 | Krook | 494/4 |
| 4,762,615 | A | 8/1988 | Drori | 210/333.01 |
| 4,784,634 | A | 11/1988 | Schiele | 494/56 |
| 4,793,932 | A | 12/1988 | Ford et al. | 210/636 |
| 4,813,923 | A | 3/1989 | Johansson | 494/48 |
| 4,820,256 | A | 4/1989 | Nordstrom | 494/3 |
| 4,840,612 | A | 6/1989 | Pallmar | 494/2 |
| 4,861,329 | A | 8/1989 | Borgstrom et al. | 494/67 |
| 4,872,988 | A | 10/1989 | Culkin | 210/636 |
| 4,876,006 | A | 10/1989 | Ohkubo et al. | 210/321.69 |
| 4,925,442 | A | 5/1990 | Bodelson | 494/40 |
| 4,952,317 | A | 8/1990 | Culkin | 210/636 |
| 4,978,331 | A | 12/1990 | Luchetta | 494/37 |
| 4,995,977 | A | 2/1991 | Hilgendorff et al. | 210/321.69 |
| 5,045,049 | A | 9/1991 | Lantz | 494/70 |
| 5,052,996 | A | 10/1991 | Lantz | 494/68 |
| 5,108,604 | A | 4/1992 | Robbins | 210/321.74 |
| 5,143,613 | A | 9/1992 | Bitter et al. | 210/321.8 |
| 5,182,019 | A | 1/1993 | Cote et al. | 210/321.8 |
| 5,197,939 | A | 3/1993 | Cederkvist | 494/53 |
| 5,202,024 | A | 4/1993 | Andersson et al. | 210/360 |
| 5,225,080 | A | 7/1993 | Karbachsch et al. | 210/321.75 |
| 5,244,584 | A | 9/1993 | Schlieperskoetter | 210/787 |
| 5,338,284 | A | 8/1994 | Knelson | 494/28 |
| 5,362,292 | A | 11/1994 | Borgstrom et al. | 494/74 |
| 5,366,625 | A | 11/1994 | Pedersen et al. | 210/321.78 |
| 5,374,234 | A | 12/1994 | Madsen | 494/53 |
| 5,380,434 | A | 1/1995 | Paschedag | 210/360 |
| 5,397,471 | A | 3/1995 | Rodebush | 210/360 |
| 5,429,581 | A | 7/1995 | Michaud | 494/54 |
| 5,441,651 | A | 8/1995 | Yamaguchi et al. | 210/780 |
| 5,445,771 | A | 8/1995 | Degen | |
| 5,500,122 | A | 3/1996 | Schwartz | 210/321.75 |
| 5,550,022 | A | 8/1996 | Chakraborty et al. | 435/6 |
| 5,599,271 | A | 2/1997 | Eiken | 494/37 |
| 5,601,522 | A | 2/1997 | Piramoon | 156/172 |
| 5,601,524 | A | 2/1997 | Knelson | 494/29 |
| 5,618,409 | A | 4/1997 | Kreill | 210/97 |
| 5,759,744 | A | 6/1998 | Brueck et al. | 430/312 |
| 5,779,619 | A | 7/1998 | Borgstrom et al. | 494/56 |
| 5,792,037 | A | 8/1998 | Bodelson et al. | 494/40 |
| 5,820,767 | A | 10/1998 | Kane et al. | 210/787 |
| 5,824,217 | A | 10/1998 | Pearl et al. | 210/321.75 |
| 5,922,201 | A | 7/1999 | Yamamori | 210/321.79 |
| 5,979,668 | A | 11/1999 | Kane et al. | 210/446 |
| 6,033,564 | A | 3/2000 | Kirker et al. | 210/232 |
| 6,149,572 | A | 11/2000 | Knelson | 494/37 |
| 6,161,435 | A | 12/2000 | Bond et al. | 73/587 |
| 6,248,053 | B1 * | 6/2001 | Ehnstrom et al. | 494/56 |
| 6,312,610 | B1 | 11/2001 | Kirker et al. | 210/781 |
| 6,322,698 | B1 | 11/2001 | Rios et al. | 210/321.75 |
| 6,358,193 | B1 | 3/2002 | Nyberg | 494/2 |
| 6,387,271 | B1 | 5/2002 | Geibel et al. | 210/651 |
| 6,390,964 | B1 | 5/2002 | Mackel | 494/14 |
| 6,468,198 | B1 | 10/2002 | Mackel | 494/37 |
| 6,656,356 | B2 | 12/2003 | Gungerich et al. | 210/321.8 |
| 6,685,832 | B2 | 2/2004 | Mahendran et al. | 210/321.8 |
| 6,702,941 | B1 | 3/2004 | Haq et al. | 210/315 |
| 6,706,180 | B2 * | 3/2004 | Kirker et al. | 210/232 |
| 6,706,189 | B2 | 3/2004 | Rabie et al. | 210/636 |
| 6,708,957 | B2 | 3/2004 | Cote et al. | 261/23.1 |
| 6,739,459 | B1 | 5/2004 | Hartmann | 210/457 |
| 6,770,202 | B1 | 8/2004 | Kidd et al. | 210/650 |
| 2004/0016699 | A1 | 1/2004 | Bayevsky | 210/636 |

FOREIGN PATENT DOCUMENTS

| | | | | |
|---|---|---|---|---|
| EP | 0346056 | 12/1989 | | B04B 1/08 |
| FR | 870450 | 3/1942 | | 14/6 |
| FR | 1038726 | 10/1953 | | |
| JP | 2307587 | 12/1990 | | C02F 1/44 |
| JP | 11330379 | 10/1999 | | |
| JP | 2001113204 A * | 4/2001 | | B04B 1/02 |
| WO | 00/02663 | 1/2000 | | B04B 1/00 |
| WO | WO 00/02663 A1 * | 1/2000 | | |
| WO | 02/42004 A1 | 5/2002 | | B04B 15/06 |

OTHER PUBLICATIONS

International Search Report PCT/US04/07384, 11 pages.
International Search Report and Written Opinion for application No. PCT/US04/32817, 8 pages, Jan. 19, 2005.
International Search Report and Written Opinion for application No. PCT/US04/24661, 9 pages, Dec. 9, 2004.
International Search Report PCT/US 99/15891, 6 pages, Jul. 12, 1999.
International Search Report PCT/US 02/13186, Sep. 10, 2002.
International Search Report PCT/US 02/36830, 8 pages, Mar. 12, 2003.

* cited by examiner

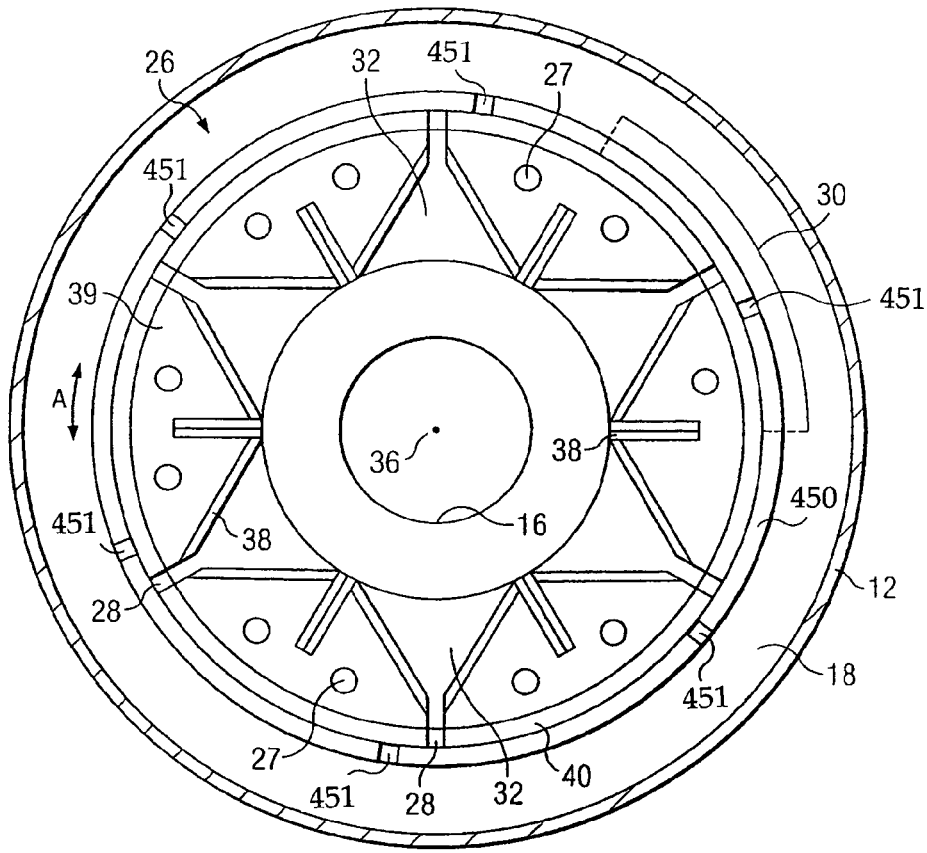
FIG. 2C
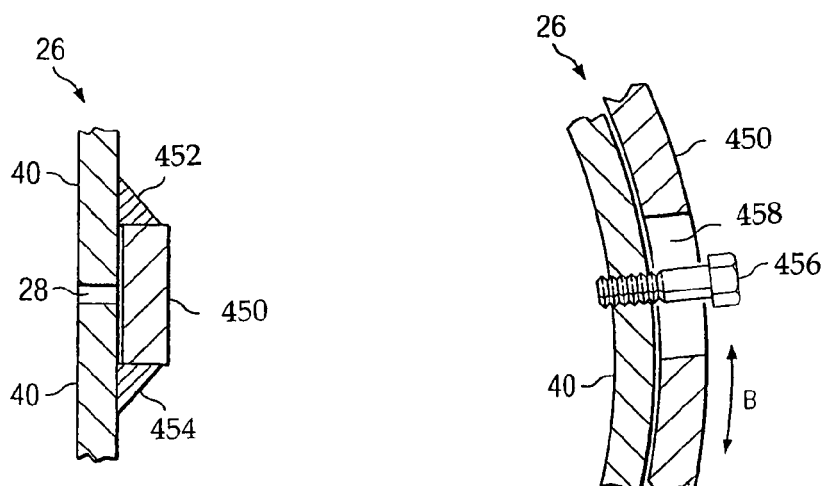
FIG. 22
FIG. 23B

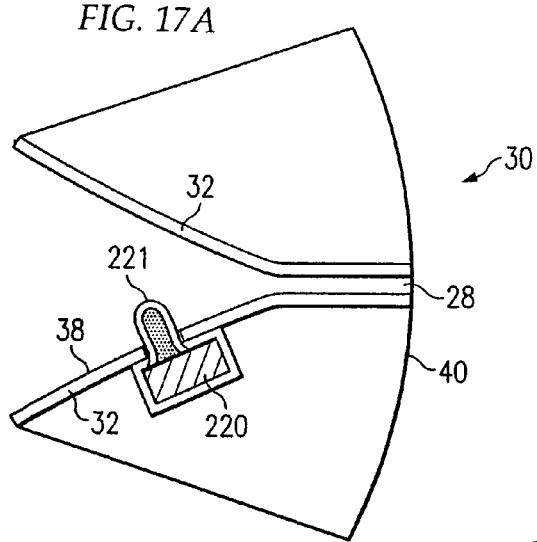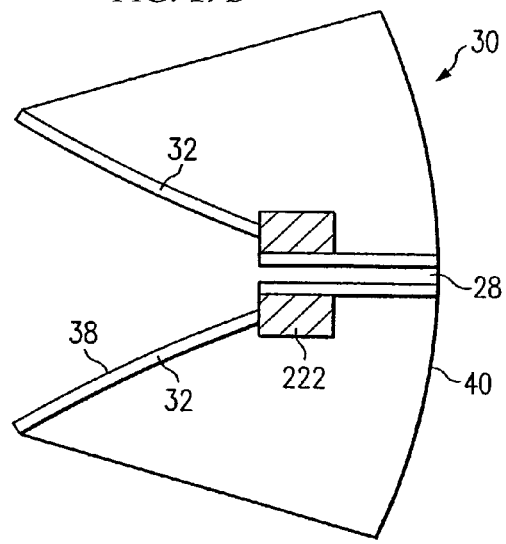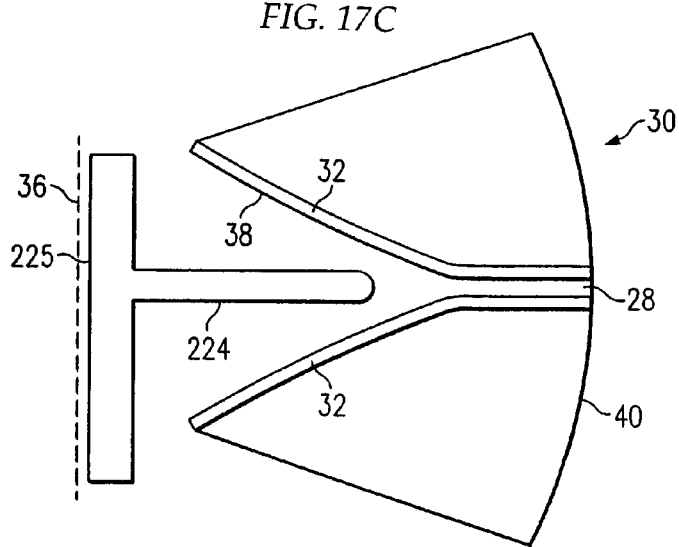

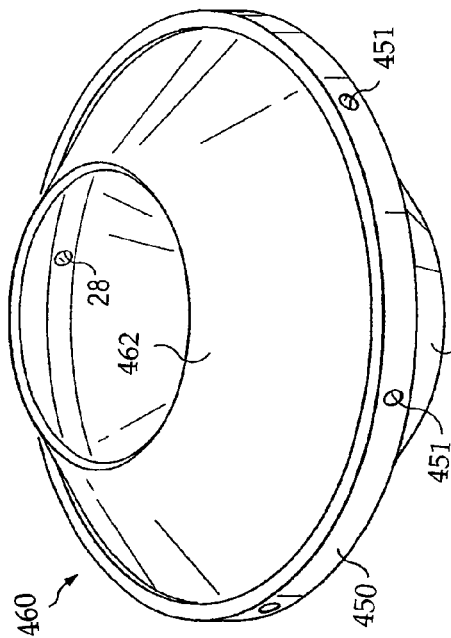
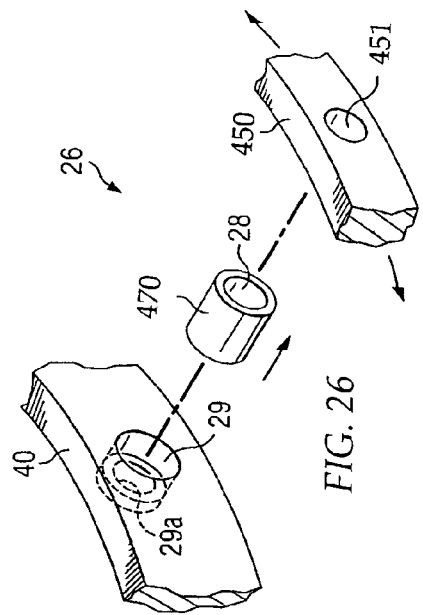
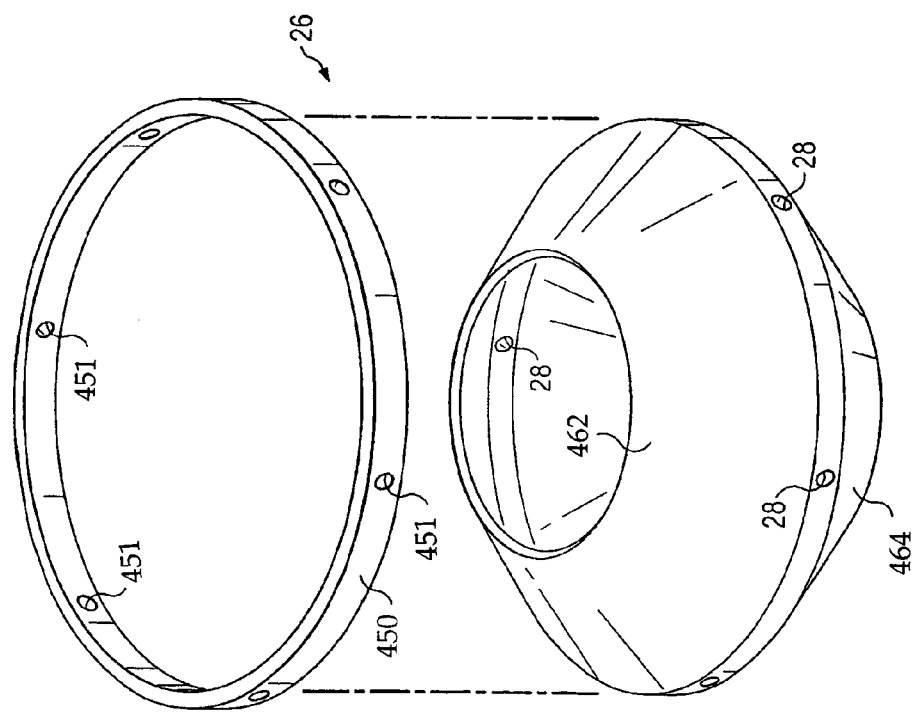

CENTRIFUGE WITH COMBINATIONS OF MULTIPLE FEATURES

CROSS REFERENCE TO RELATED APPLICATION

This application claims priority to U.S. Provisional Patent Application Ser. No. 60/483,275 filed Jun. 25, 2003, and entitled "Density Screen Centrifuges with Multiple Features Combinations".

This application is also a co-pending application to U.S. patent application Ser. No. 10/798,124 filed Mar. 11, 2004, which claims priority to U.S. Provisional Patent Application Ser. No. 60/454,448 filed Mar. 11, 2003;

U.S. patent application Ser. No. 10/294,840 filed Nov. 14, 2002, now U.S. Pat. No. 6,706,180, which is a continuation-in-part of U.S. patent application Ser. No. 10/217,734 filed on Aug. 13, 2002, now U.S. Pat. No. 6,805,805, and also claims priority to U.S. Provisional Patent Application Ser. No. 60/332,238 filed Nov. 15, 2001; and U.S. patent application Ser. No. 10/131,102 filed Apr. 24, 2002, now U.S. Pat. No. 6,755,969, which claims priority to U.S. Provisional Patent Application Ser. No. 60/286,745 filed Apr. 25, 2001.

TECHNICAL FIELD OF THE INVENTION

This disclosure relates in general to the field of centrifugal devices, and more particularly to a centrifuge having replaceable internal components with controlled discharge of dense material including a system and method for vibration in the centrifuge.

BACKGROUND OF THE INVENTION

Over the past several years, demand has increased for the efficient removal of contaminants from water supplies. Because of their relatively small size, many light density contaminants (e.g., microorganisms) have failed to be removed by conventional processing methods including fluid separation.

Fluid separation may include any process that captures and removes materials from a liquid stream, typically resulting in a clarified liquid having reduced contaminants and a denser stream containing removed contaminants. Further treating the denser stream in a thickening process may remove additional liquid to leave a thick, pump-able slurry mixture containing nine to approximately twelve percent solids by weight. Under certain conditions, a de-watering process may remove more water from the slurry mixture. The de-watering process may create a stackable but still moist mixture of approximately twelve to thirty percent solids by weight. In an extreme de-watering process, the resulting mixture may comprise up to forty percent solids by weight. In treating a clarified liquid, an associated clarifying process may remove suspended solid particles leaving a substantially further clarified fluid.

One type of fluid separation technique may include a membrane filtration process. Typically, a membrane filtration process removes particles from a liquid by retaining the particles in a filter of a specific size suited for a particular application. Some examples of membrane filtration processes include microfiltration, ultrafiltration, and nanofiltration. For insoluble particles, microfiltration can be used to retain and remove these particles from a liquid. Ultrafiltration may define a purification process that serves as a primary purification filter to isolate a desired solid product of a specific size. A nanofiltration process may be used in a final purification process to remove contaminants as small as microscopic bacterial cyst.

Another example of a fluid separation technique may include centrifugal separation. In centrifugal separation, a centrifuge may use centrifugal force to separate more dense contaminants from a fluid medium to leave a clarified fluid. By creating a centrifugal force several times greater than gravity, more dense contaminants separate from the fluid medium. To create centrifugal force within the centrifuge, the fluid medium is often placed within a chamber that rotates along a symmetrical axis creating the centrifugal force in a radial direction away from the symmetrical axis. More dense contaminants suspended in the fluid medium are forced against an outer wall of the rotating chamber and may pass through openings in the chamber to an outer catchment basin. The resulting clarified fluid, which is less dense, remains near the axis of rotation and may typically be removed from the chamber via a clarified fluid outlet.

As more dense contaminants are extracted from the fluid medium, the openings formed in the wall that allow the more dense contaminants to be expelled from the rotating chamber may become clogged with particulate matter or solids. Despite high centrifugal force, particulate matter may clog the openings and create a build up of relatively solid materials behind this "clog-point". Once an opening is clogged, the centrifuge must be stopped and the clog cleared in order for the centrifuge to be returned to service.

Another problem may exist within the centrifuge due to the rotation of the chamber. As the chamber rotates around a center axis, inertia or momentum of the fluid medium being rotated may develop an inner swirling pattern within the chamber, known as a cyclonic vorticity. Because this vorticity often creates an agitation within the associated chambers, it may be desired to avoid this cyclonic vorticity effect by limiting rotational speeds.

One method of controlling a centrifugal separation process is to control the release of the more dense contaminants from the rotating chamber. To control this release, the opening in the chamber may be used to vary the amount of more dense contaminants moving through the passage. Some of the problems associated controlling the release of more dense contaminants through the opening include the direction of valve movement, the location of the valve members, and the location of the actuator for controlling the valve.

SUMMARY OF THE INVENTION

In accordance with teachings of the present invention, disadvantages and problems associated with a centrifuge have been substantially reduced or eliminated. In one embodiment, a centrifuge for removing more dense particles or other more dense contaminants from a fluid medium may include a fluid separation wall placed within a sleeve to form a containment zone therebetween. The fluid separation wall has an inner surface, a middle section and an outer surface. The containment zone may receive a portion of the fluid medium having a greater concentration of the more dense material. The fluid separation wall may be aligned generally parallel to an axis of rotation and may rotate relative to the axis of rotation. At least one receptacle may aid in separation of the more dense material from the fluid medium. The receptacle may be defined in part by a respective geometry formed on the inner surface and a respective shape formed in the middle section to form a void area between the inner and outer surface. At least one opening may extend through the fluid separation wall from the void area to the outer surface of the receptacle. The opening may transport the more dense material to the containment zone. An excitation apparatus may be associated with the receptacle. The excitation apparatus may create a vibration within the receptacle to cause some more dense fluid to move along the flow path towards the containment zone.

In further embodiment, the centrifuge may further include a valve ring that forms a part of the fluid separation wall. The valve ring may include at least one valve orifice formed in the valve ring. The valve ring may have a first position that blocks the more dense material from exiting the receptacle and a second position that allows the more dense material to exit the fluid separation wall and move into the containment zone.

In another embodiment of the present invention, a method of separating more dense material from a fluid medium in a centrifuge includes rotating a fluid separation wall around an axis of rotation within the centrifuge to produce a centrifugal force that causes the more dense material in the fluid medium to separate from the fluid medium. A method further includes directing the more dense material along a flow path through a void area towards an opening in the fluid separation wall such that the more dense material exits the fluid separation wall via the opening and deposits into a containment zone formed between the centrifugal core and a non-rotating sleeve. The method further includes creating an excitation force within the centrifuge such that the excitation force imparts a vibration on the more dense material. The method further includes controlling the flow of the more dense material moving along the flow path.

In some embodiments, the method further includes compressing the separated more dense material in at least one flow path of the receptacle compressing the separated more dense material in at least one of the flow paths of a receptacle by blocking at least a portion of the flow path with a portion of a valve ring. The method further includes moving the valve ring along an outer surface of the fluid separation wall to release the more dense material compressed within the flow path such that the more dense material exits the fluid separation wall.

One technical advantage of the present invention may include reducing friction effect of a receptacle wall with respect to movement of more dense material along the wall. Vibration in the receptacle may create a "slippery" wall effect thus reducing effective frictional forces imparted on more dense material against the walls. This "slippery" wall effect may cause more dense material to proceed along the wall to an associated opening for separation from a fluid medium.

Another technical advantage of the present invention includes preventing or reducing compacting of more dense material in a receptacle during increased de-watering. Vibration may cause more dense material to collect in the receptacle and move through an associated opening. A build up of such more dense material may clog the opening further compacting more dense material, which removes more clarified fluid. Vibrations may then cause the particle to breakup at a desired operating condition thus removing the de-watered more dense material from the receptacle.

A further technical advantage of the present invention may include varying the velocity of separation of more dense material in a fluid medium. Steep or shallow walls on an interior of a receptacle wall may create frictional forces as more dense material moves towards an associated opening. The frictional forces may vary depending upon the angle or slope of the receptacle walls. By increasing the angle or slope, such as adding a steep wall, more dense material may move more rapidly toward the associated opening. This may decrease desired separation caused by centrifugal force since less dense fluid may be carried out an associated opening along with more dense material. Providing a shallow sloped wall one or more interior surfaces of a receptacle allows frictional forces to slow the movement of more dense material, which permits additional removal of liquids such as water from more dense material as it moves more slowly along the walls of the receptacle towards the associated opening. Vibrational forces may be incorporated with these sloped walls to further aid in separation of more dense material from the fluid medium.

A further technical advantage of the present invention may include prevention of clogging of openings in a fluid separation wall. In some embodiments of the present invention, an anti-clogging projection may be placed in the opening to prevent clogging by the more dense particles. The anti-clogging projection may be formed within the inner surface of a nozzle to create a turbulent flow out of the nozzle. The turbulent flow may prevent blockage as the more dense particles exit the nozzle.

A further technical advantage of the present invention includes disrupting any cyclonic vorticity created in a void area of a receptacle. Placing an anti-vorticity projection in a receptacle may prevent formation of a cyclonic vorticity within the void area of the receptacle. Preventing this vorticity may enhance separation of the more dense particles from the fluid medium.

All, some or none of these technical advantages may be present in various embodiments of the present invention. Other technical advantages will be readily apparent to one skilled in the art from the following figures, descriptions, and claims.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein:

FIGS. 2A, 2B and 2C illustrate schematic drawings in section taken along lines 2—2 of FIGS. 1A, 1B and 1C, respectively;

FIGS. 17A–17D illustrate other example embodiments of excitation devices placed at various locations in the receptacle according to the teachings of the present invention;

FIG. 22 illustrates a cross sectional side view of a portion of the fluid separation wall including a valve ring according to teachings of the present invention;

FIG. 23B illustrates a top cross-sectional view of an alternative example embodiment of the pin and slot arrangement for guiding the valve ring incorporating teachings of the present invention;

FIGS. 24 and 25 illustrate perspective and isometric views of an example embodiment of a split-cone fluid separation wall including the valve ring according to the teachings of the present invention;

FIG. 26 illustrates an exploded perspective view of a portion of the fluid separation wall including an example embodiment of a self-adjusting wear nozzle placed in an opening sleeve according to the teachings of the present invention;

DETAILED DESCRIPTION OF THE INVENTION

Preferred embodiments of the present invention and their advantages are best understood by reference to FIGS. 1 through 32 where like numbers are used to indicate like and corresponding parts.

Figure 1A:
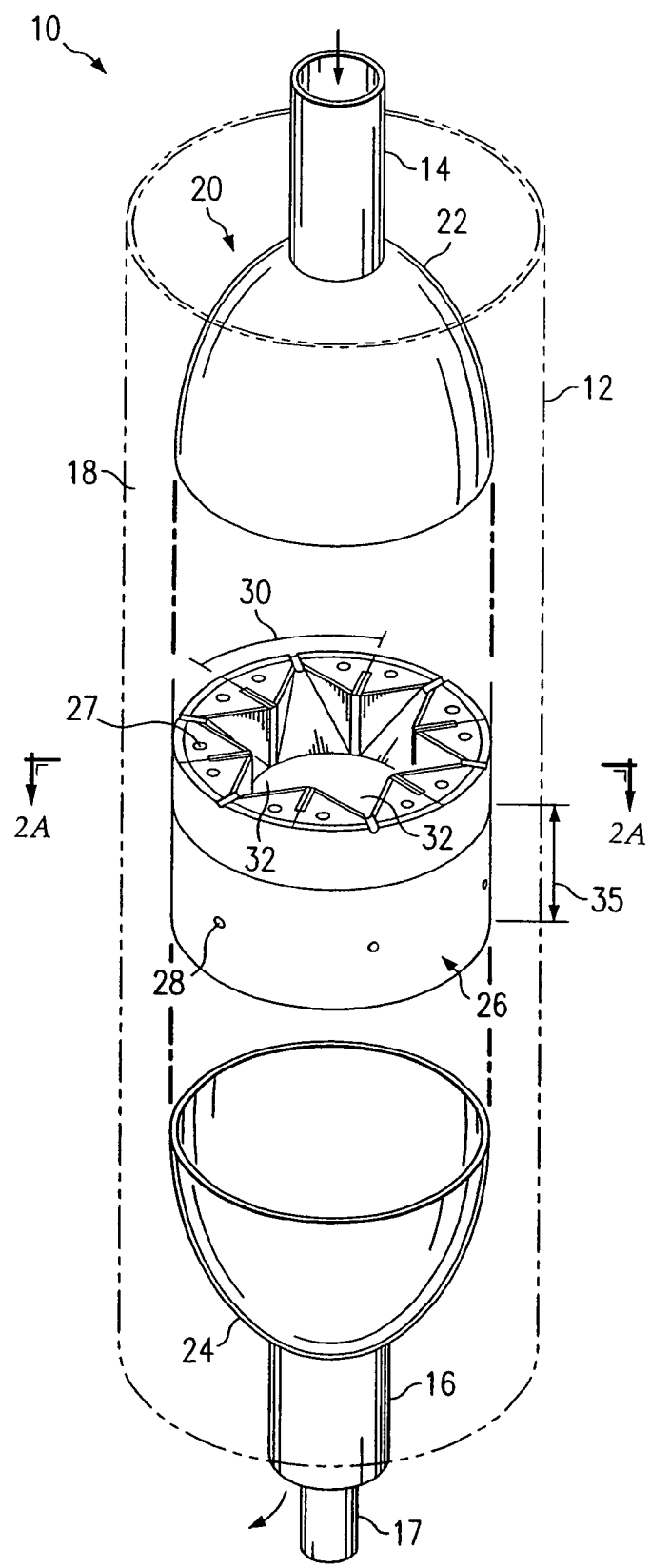
FIGS. 1A, 1B and 1C illustrate schematic drawings showing isometric views with portions broken away of a centrifuge incorporating teachings of the present invention.
Figure 1B:
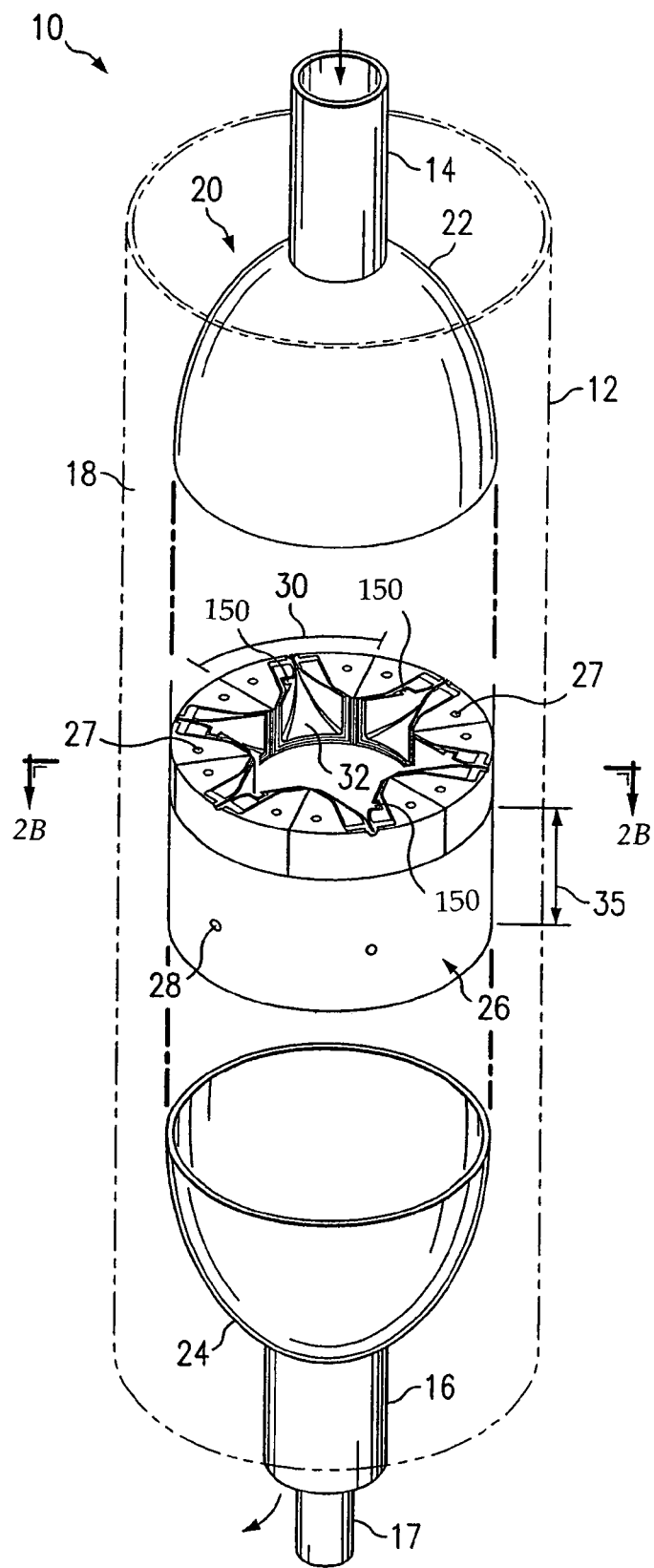
Figure 1C:
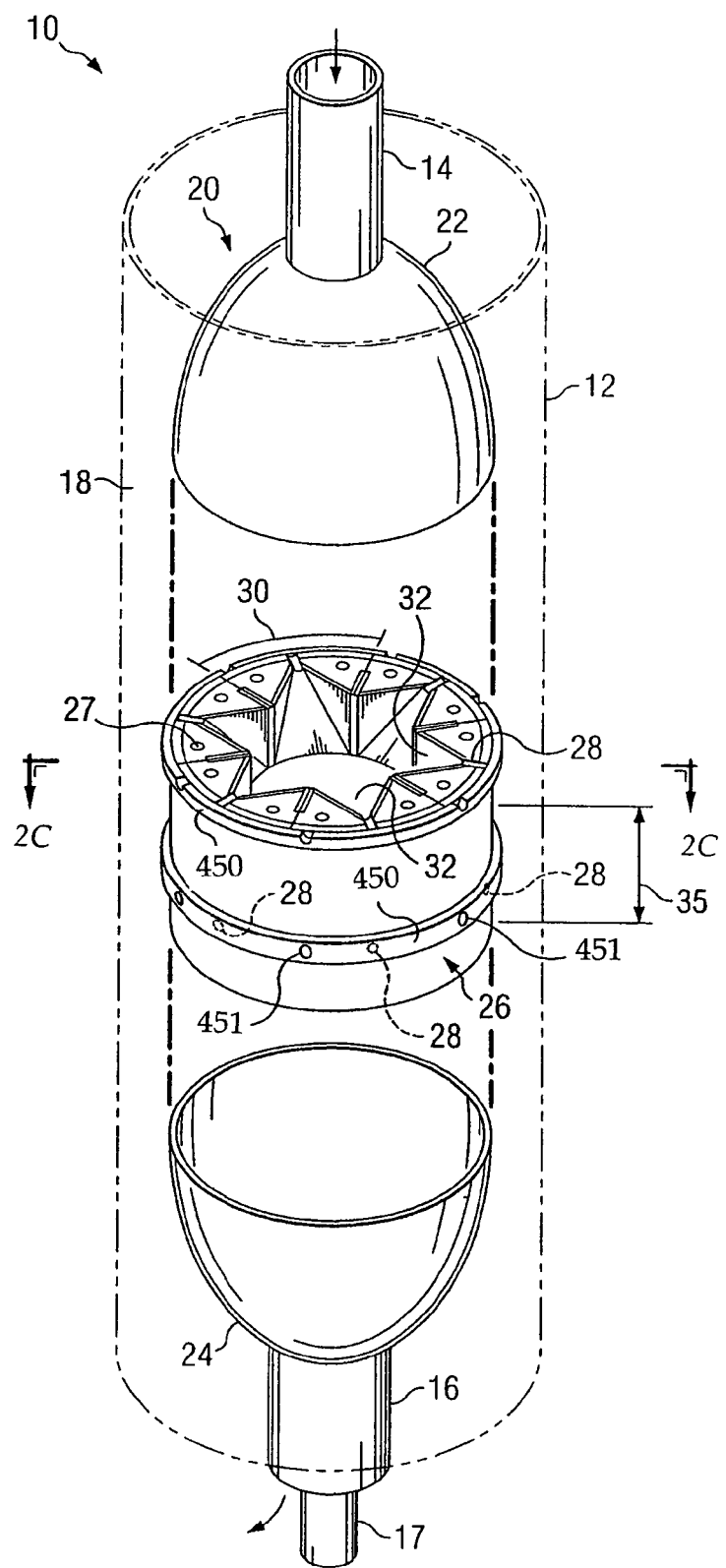

FIGS. 1A, 1B and 1C illustrate schematic drawings showing isometric views with portions broken away of example embodiments of centrifuge 10. Centrifuge 10 may include centrifugal core 20 disposed within non-rotating outer sleeve 12. Centrifugal core 20 may include fluid medium inlet 14, clarified fluid outlet 16, and fluid separation wall 26. Fluid separation wall 26 may be encapsulated between first housing cover 22 and second housing cover 24.

Non-rotating outer sleeve 12 may form accumulation area or containment zone 18 between centrifugal core 20 and non-rotating outer sleeve 12. Accumulation area 18 may collect more dense particles and other contaminants that have been separated from the fluid medium and have passed through openings 28. As the more dense particles collect within accumulation area 18, the heavy density particles may flow between centrifugal core 20 and non-rotating outer sleeve 12 away from centrifuge 10.

Fluid medium inlet 14 may be attached to upper housing cover 22 to provide an opening into centrifuge 10 for the fluid medium. Although fluid medium inlet 14 is shown attached to first housing cover 22, fluid medium inlet 14 may be positioned at any location on centrifugal core 20.

Clarified fluid outlet 16 may be formed in second housing cover 24. Clarified fluid outlet 16 may be used for removal of the clarified fluid after the more dense particles are removed through openings 28 in fluid separation wall 26.

Fluid separation wall 26 may be disposed between first housing cover 22 and second housing cover 24. First housing cover 22 and second housing cover 24 may be used to form the end pieces of centrifugal core 20 with fluid separation wall 26 disposed therebetween. Fluid separation wall 26 may be formed from various sections and include various receptacles with respective geometries and shapes. These various sections 35 may include several horizontal layers of receptacles stacked together to form fluid separation wall 26. Alternatively, fluid separation wall 26 may be formed from several vertical columns (not expressly shown) of receptacles placed together to form fluid separation wall 26. For some embodiments, first housing cover 22 and second housing cover 24 may be attached with long bolts (not expressly shown) through bolt holes 27 to hold together the various sections and components of fluid separation wall 26.

Centrifugal core 20 is designed to rotate within non-rotating sleeve 12. This rotation may create a centrifugal force to separate the more dense particles from a fluid medium. In some embodiments, a transmission shaft 17 rotates centrifugal core 20 to create the centrifugal force. The rotation of transmission shaft 17 develops the centrifugal force within centrifugal core 20 in the range of approximately five hundred to approximately eight thousand gravities, depending on the speed and the diameter of centrifugal core 20. By providing a large centrifugal force within centrifugal core 20 such as eight thousand gravities, more dense particles as small as approximately 0.5 microns in size may be separated from the fluid medium. In some embodiments, centrifuge 10 imparts a centrifugal force on the fluid medium for removal of particulate matter in the range of approximately three millimeters to approximately 0.5 microns.

As the fluid is affected by the centrifugal force, the varying densities within the fluid medium are separated with the heavier, more dense particles being forced towards non-rotating outer sleeve 12. As these more dense particles approach opening 28 in fluid separation wall 26, the centrifugal force is at its maximum due to the distance from axis of rotation 36, as shown in FIG. 2. Typically, the particles exiting through openings 28 are disposed on non-rotating outer sleeve 12. The remaining fluid, or clarified fluid, contained within the innermost part of fluid separation wall 26 may overflow centrifugal core 20 into clarified fluid outlet 16. Depending upon the extraction rate of the particles, additional fluid medium may be placed within centrifugal core 20. Typically, the flow rate of fluid medium into centrifugal core 20 may be in the range of approximately thirty to approximately five hundred gallons per minute. In some embodiments, the flow rate of the fluid medium is approximately sixty to one hundred and twenty-five gallons per minute.

Fluid separation wall 26, encased within first housing cover 22 and second housing cover 24, may include receptacle 30 formed on fluid separation wall 26. Receptacle 30 may include a specific geometry and a specific shape forming void area 32 that leads to opening 28. Depending on the respective geometry and shape of receptacle 30, the centrifugal forces within receptacle 30 may alter the separation effects of the more dense particles from the fluid medium.

Referring to FIG. 1B, to aid in separation of more dense material, receptacle 30 may further include an excitation device, such as electromechanical vibration device 150.

Referring to FIG. 1C, valve ring 450 may be formed on or coupled to an outer section or periphery of fluid separation wall 26. As such, valve ring 450 may, at times, rotate in conjunction with fluid separation wall 26. However, in some embodiments, valve ring 450 is allowed to slide and rotate independently of fluid separation wall 26.

Because the outer section of fluid separation-wall 26 encounters high centrifugal forces, valve ring 450 may be formed in a hoop or ring shape that fits around the circumference of fluid separation wall 26. The ring shape may help in preventing deformation of valve ring 450 under high centrifugal force. Valve ring 450 is typically placed over openings 28 to control the flow of more dense material from exiting the receptacle 30. In some instances where centrifuge 10 is constructed in several sections 35, each section 35 may include a respective valve ring 450.

In order to permit the more dense material to exit receptacle 30 and move into containment zone 18, valve ring 450 includes at least one valve orifice 451. Typically, valve ring 450 includes a plurality of valve orifices 451 that are designed to align with each opening 28 formed in section 35. In most instances, valve orifices 451 are designed to simultaneously align with a respective opening 28 to form an open position. Yet in other alternate embodiments, valve ring 450 may be designed such that one or more openings 28 align with one or more valve openings 451 while other openings 28 remain blocked by their respective valve orifice 451.

Valve ring 450 may include a first position and a second position. In the first position, valve orifices 451 of valve ring 450 are offset from respective openings 28 such that at least a portion of opening 28 is covered to block the more dense material from exiting receptacle 30. In the second position, valve ring 450 moves or slides to substantially align valve orifices 451 with openings 28 to allow the more dense material to exit fluid separation wall 26 and move into containment zone 18. Typically, valve ring 450 is biased to move from the second position to the first position such as a default position.

Figure 2A:
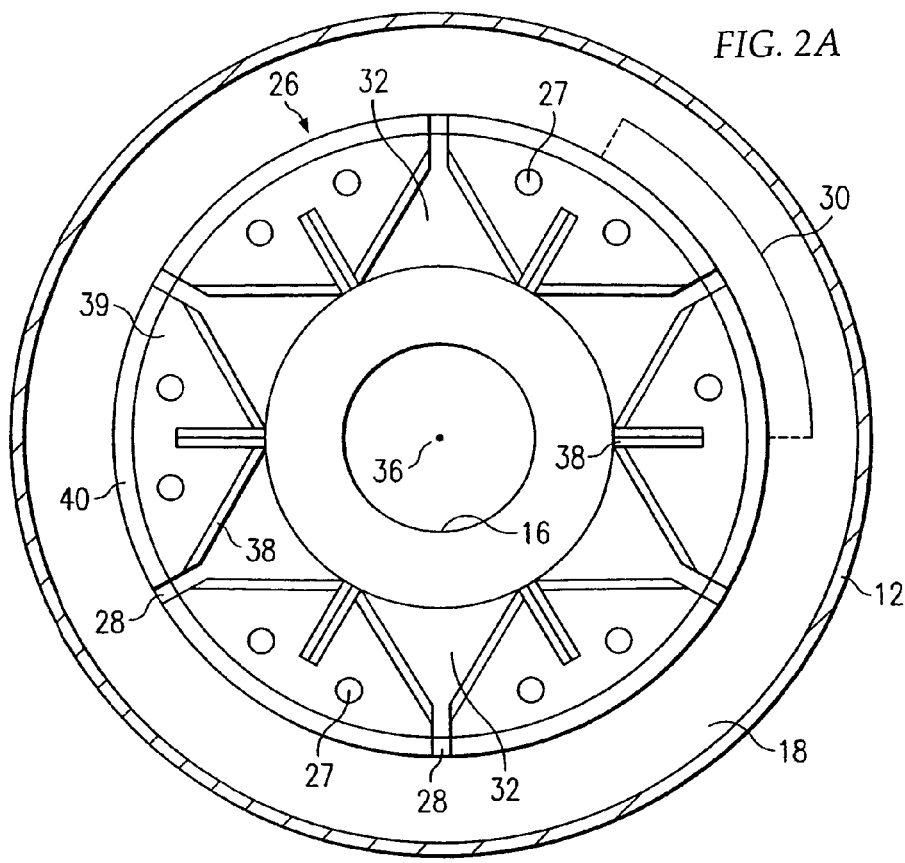
Figure 2B:
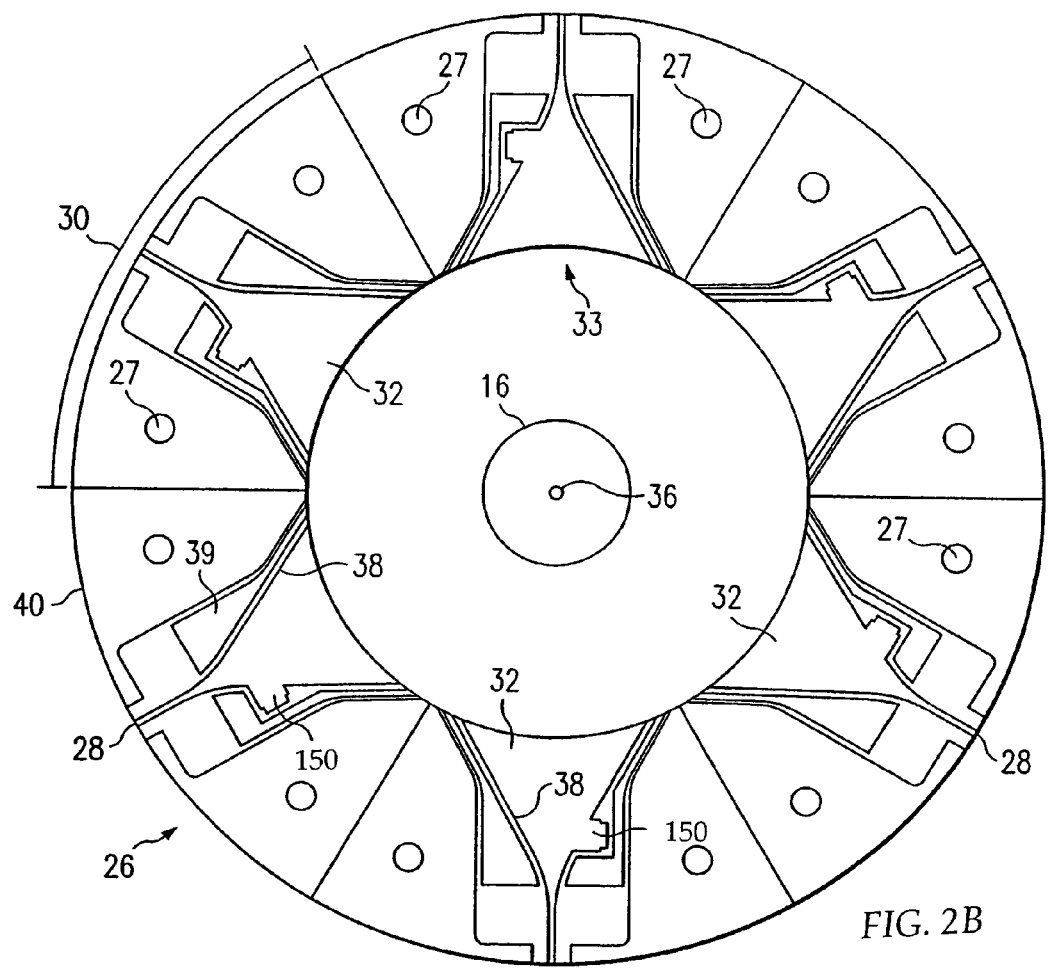

FIGS. 2A, 2B and 2C illustrate cross-sectional views of centrifuge 10 taken along lines 2—2 of FIGS. 1A, 1B and 1C respectively. Fluid separation wall 26 may be formed from a single layered wall (not expressly shown) or from a composite of different wall layers such as inner surface 38, middle layer 39, and outer surface 40 arranged around axis of rotation 36. Generally, each section 35 of fluid separation wall 26 includes at least one receptacle 30 having at least one opening 28. In some embodiments, centrifugal core 20 may include bolt holes 27 to receive long bolts (not expressly shown) that may hold segments (e.g., section 35) of fluid separation wall 26 in a fixed position. Centrifugal core 20 may be formed from inner surface 38, middle layer 39, and outer surface 40 arranged around axis of rotation 36. Centrifugal core 20 may include at least one receptacle 30 having at least one opening 28.

Inner surface 38 contacts a fluid medium and typically includes respective geometry 32 to form a part of receptacle 30. Excitation device 150 may be associated with inner surface 38 to impart vibrations on the fluid medium. Because inner surface 38 may be ablated by the fluid medium during separation of more dense material, inner surface 38 may be formed from replaceable inserts having opening 28. Typically, inner surface 38 is formed from a thin stainless steel, ceramic, plastic, urethane, or any material and/or coating suitable for providing an interior wear-resistant layer. In one embodiment, inner surface 38 is formed from a replaceable urethane liner.

Middle layer 39 may provide support and structure to inner surface 38 and may be formed from compressible materials to allow inner surface 38 to compress and seal against outer shell 40. In some embodiments, middle layer 39 may be formed as a flexible barrier placed between inner surface 38 and outer shell 40 to dampen vibrations before reaching outer shell 40. Preferably, middle layer 39 may include a urethane layer that substantially isolates vibration to inner surface 38, which may be created by excitation device 150. Typically, middle layer 39 may be formed from a urethane, filler material, polymer, or any other suitable materials.

Outer shell 40 may be formed adjacent to non-rotating outer sleeve 12 and may include opening 28. Outer shell 40 may be designed to receive middle layer 39 and inner surface 38 including excitation device 150. Typically, outer surface 40 may include an outer strength layer of wound or braided, carbon or graphite filament with a resin, metal, carbon-filled polymer, glass-filled polymer, high-strength composite plastic, or any other suitable material used to provide a high burst strength.

Opening 28 may provide a flow path for the more dense material or particles, combined with some fluid medium, to be removed from receptacle 30 to accumulation area 18. Typically, opening 28 may include a nozzle formed in receptacle 30, an insert device, or any suitable connection to provide a path for the more dense particles to travel out of receptacle 30 to accumulation area 18.

Because centrifugal core 20 may be centered on axis of rotation 36, the rotation of centrifugal core 20 may create a centrifugal force with the force being directed away from axis of rotation 36. As the fluid medium enters centrifugal core 20, the heavy particles within the fluid medium are driven outwards in a radial direction extending from axis of rotation 36 from void area 32 towards receptacle 30. The centrifugal force created by the rotation of centrifuge core 20 may increase as the particles move further away from axis of rotation 36. The increasing force may force the more dense particles out through opening 28 to be disposed in accumulation area 18 formed between non-rotating outer sleeve 12 and centrifugal core 20. Typically, opening 28 forms a part of receptacle 30, allowing for heavy sediment particles and some fluid medium to pass through receptacle 30 from inner surface 38 of fluid separation wall 26 to the non-rotating outer sleeve 12.

Referring to FIG. 2B, centrifugal core 20 may further include excitation apparatus such as electro-mechanical excitation device 150.

Referring to FIG. 2C, valve ring 450 may be in a default closed position or, in some instances, biased to a closed position. In the closed position, valve ring 450 blocks or at least partially restricts some or all of opening 28. Due to the blockage, the more dense material packs inside of opening 28. Generally, the packing (e.g., compression or compaction) of the more dense material squeezes or removes more clarified fluid from the more dense material. As such, the compression of the more dense material may be used to control the amount of "de-watering" or percentage of fluid expelled with the more dense material.

After de-watering of the more dense material, valve ring 450 may be actuated to move or rotate to an open position. In some embodiments, valve ring 450 may rotate independently from fluid separation wall 26 such that valve ring 450 slides over the surface of fluid separation wall 26 as indicated by arrow A. In the example embodiment, valve ring 450 is able to slide or rotate relative to outer surface 40 until valve orifices 451 align with openings 28. As shown, valve orifices 451 are designed to simultaneously "open" all of openings 28.

Figure 3B:
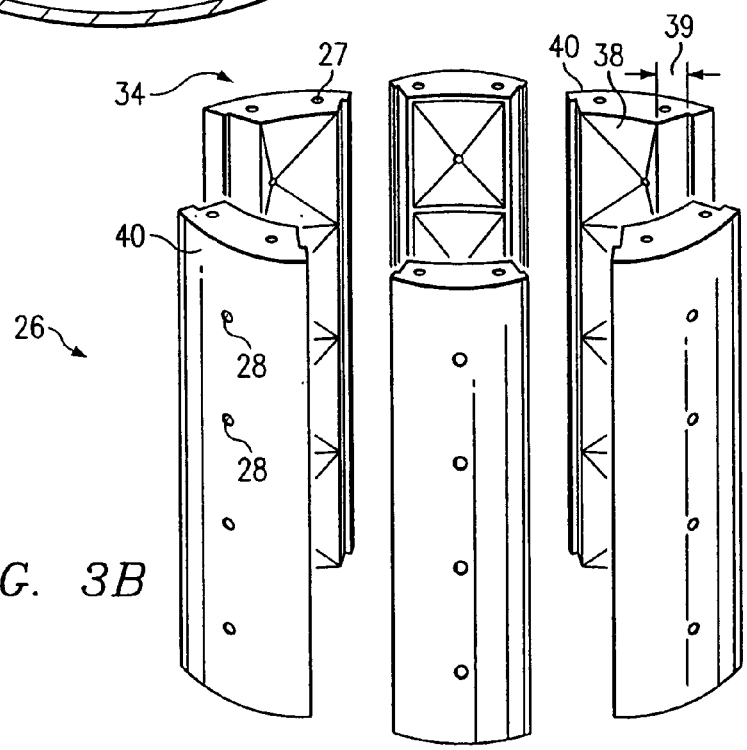
FIG. 3B illustrates a perspective view of a fluid separation wall defined in part by a receptacle wedge incorporating teachings of the present invention.
Figure 3A:
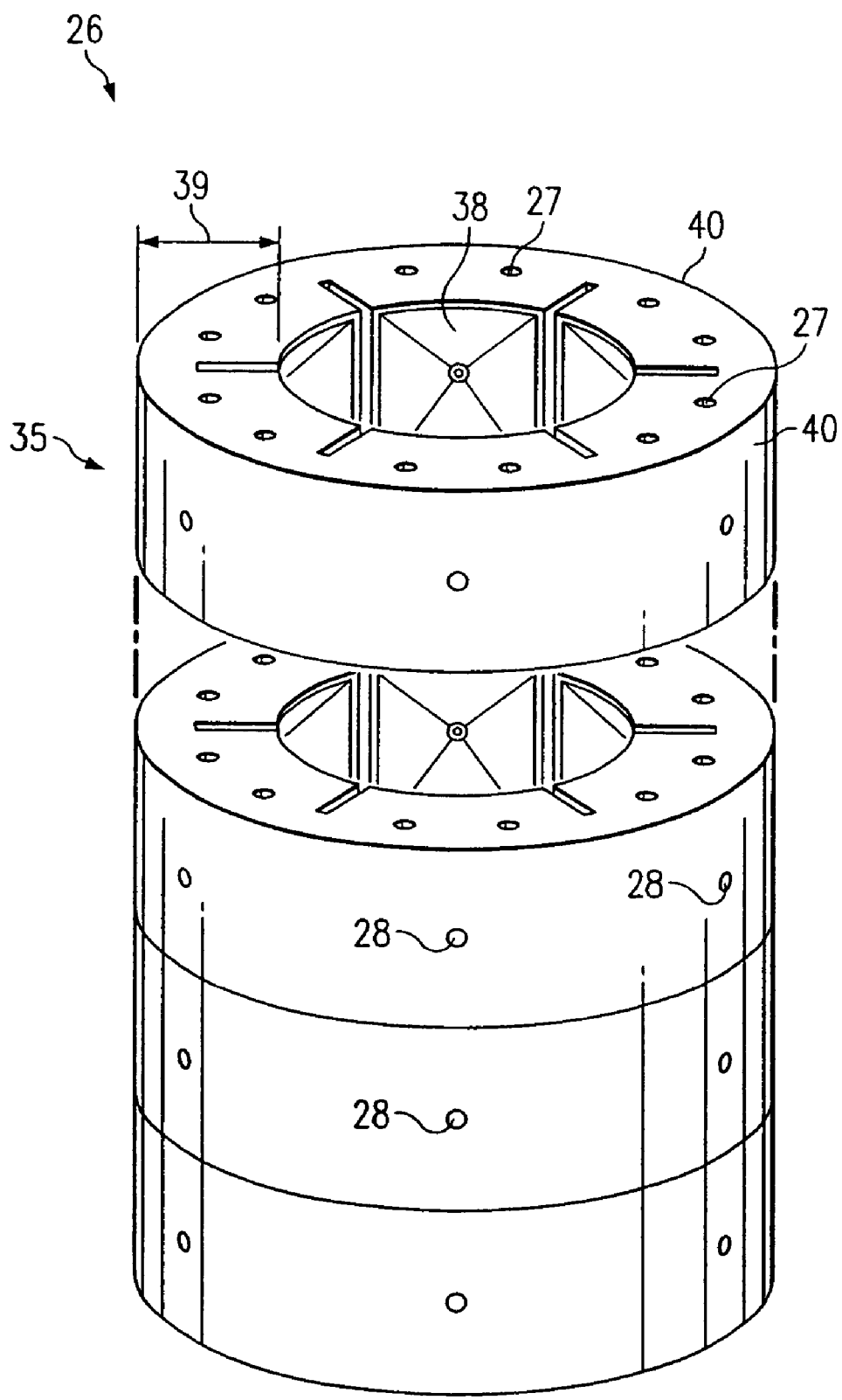
FIG. 3A illustrates a perspective view of a fluid separation wall defined in part by a receptacle disc incorporating teachings of the present invention.

FIGS. 3A and 3B illustrate a perspective view of fluid separation wall 26 having replaceable receptacle 30. In certain embodiments, fluid separation wall 26 may include receptacle 30 assembled in a modular fashion. Each component of fluid separation wall 26 may be pieced together to form a completed wall unit.

Receptacle 30 may include at least one opening 28 in each receptacle, however the number of openings may vary depending upon the configuration of receptacle 30. Receptacle 30 may form a replaceable insert that may be used to assemble fluid separation wall 26 in a modular fashion. In some embodiments, fluid separation wall 26 may be formed by replaceable inserts including a stack of receptacle discs 35. Receptacle discs 35 may include a circular formation of receptacles 30 arranged to be inserted between first housing cover 22 and second housing cover 24. Alternatively, fluid separation wall 26 may be formed with receptacle wedge 34 of receptacles 30. Single receptacle wedge 34 may include at least one receptacle 30 placed to form one section of fluid separation wall 26. By placing receptacle wedge 34 adjacent to other receptacle wedges 34 in a "pie" arrangement, fluid separation wall 26 may be formed in modules and enclosed by first housing section 22 and second housing section 24. Receptacle wedge 34 and receptacle disc 35 may be produced by investment casting, machine stamping, or any other suitable means of forming the respective receptacle shapes.

Figure 4:
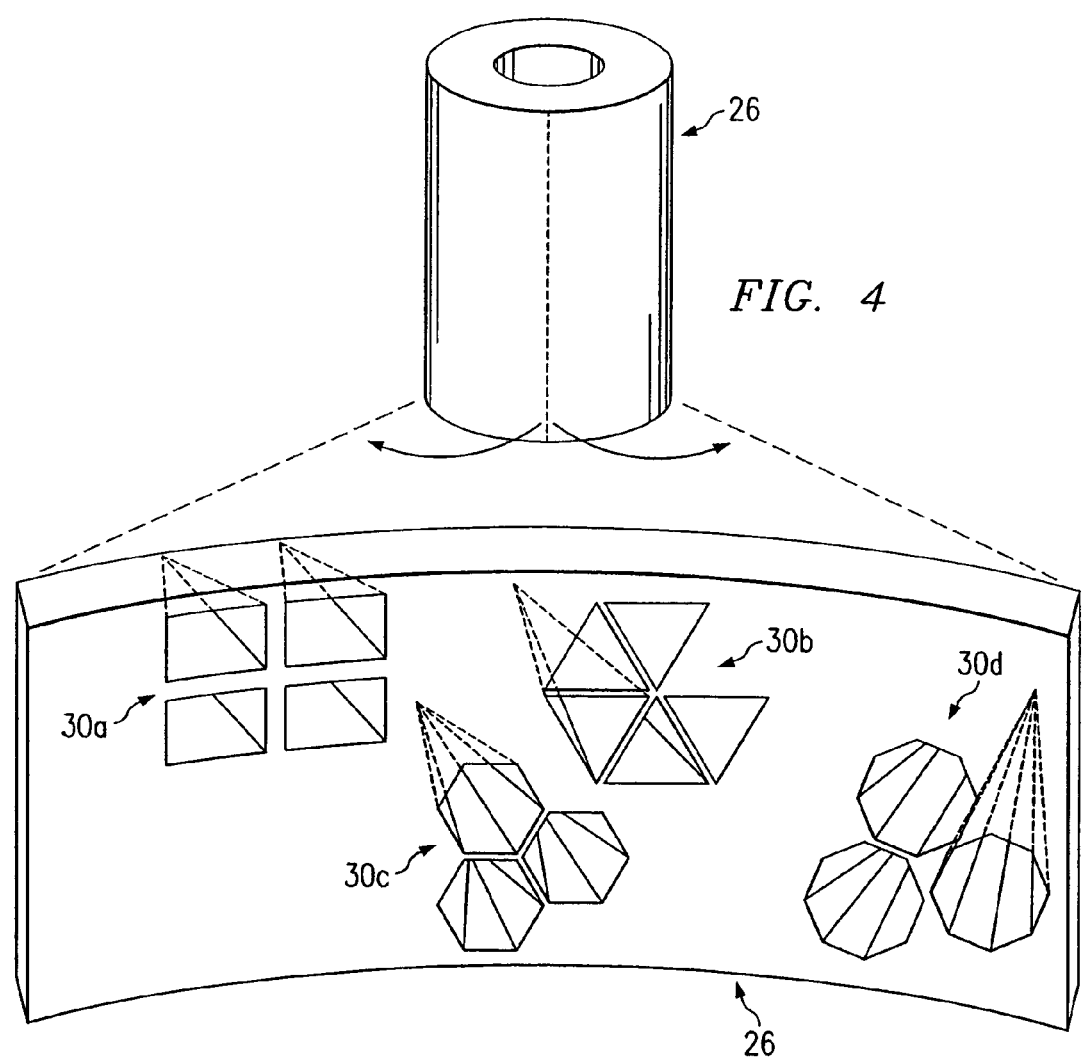
FIG. 4 illustrates a perspective view of the fluid separation wall including example embodiments of receptacles incorporating teachings of the present invention.

FIG. 4 illustrates a perspective view of fluid separation wall 26 including example embodiments of receptacle 30a, 30b, 30c, 30d. Depending on a particular separation application, receptacle 30 may include a variety of geometries formed on separation wall 26 and may further include a variety of shapes formed within middle layer 39. In some embodiments, receptacle 30a, 30b, 30c, 30d may be formed in a honeycomb fashion along inner surface 38 of fluid separation wall 26 to separate the more dense particles from the fluid medium.

Depending upon the application of the fluid separation, the geometry selected may include four-sided receptacle 30a, triangular receptacle 30b, hexagonal receptacle 30c or octagonal receptacle 30d. Other geometries of receptacle 30 formed on inner surface 38 may include a triangle, square, a rectangular, a trapezoid, a diamond, a rhombus, a pentagon, a hexagon, an octagon, a circle, an oval, a multi-walled shape, or any other geometry suitable to form receptacle 30 on inner surface 38.

In addition to forming a specific geometry, receptacle 30 may include a variety of shapes. The shape of receptacle 30 formed in middle layer 39 may include a pyramidal, a triangular, a pentagonal, hexagonal, octagonal, trapezoidal, or any other multi-walled shape operable to provide a void area within fluid separation wall 26. The shapes of receptacle 30 may further be defined to include curved walls, compound curved walls, steep sloped walls, shallow sloped walls, straight walls, flat walls, asymmetric shaped walls, irregular shaped walls, any combination thereof, or any other wall shape suitable to form receptacle 30 within middle layer 39.

In some embodiments, receptacle 30 may include a geometry formed on the interior wall of fluid separation wall 26 having converging sloped walls leading from the interior surface of fluid separation wall 26 to a center opening 28 in the exterior portion of fluid separation wall 26. In certain embodiments, receptacle 30 may be formed with several receptacles 30 arranged in a honeycomb fashion. In another embodiment, receptacle 30 may be arranged to comprise an area of eighty percent or higher of the total surface of fluid separation wall 26. Depending upon the application requiring centrifugal separation, fluid separation wall 26 may include combinations of different shaped receptacles 30 formed on inner surface 38. In further embodiments, receptacle 30 may comprise a combination of the different geometries and shapes to form fluid separation wall 26.

Figure 5A:
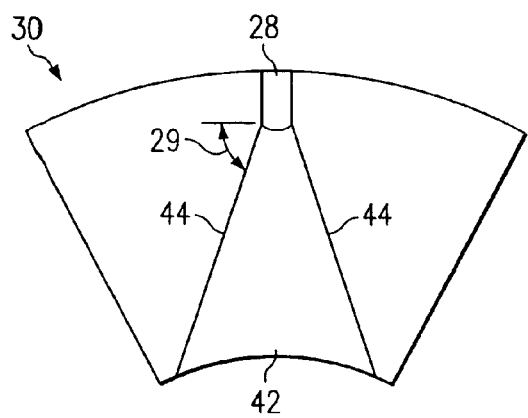
FIGS. 5A and 5B illustrate a perspective and cross-sectional view of an example embodiment of a receptacle having straight sloped sidewalls according to the teachings of the present invention.
Figure 5B:
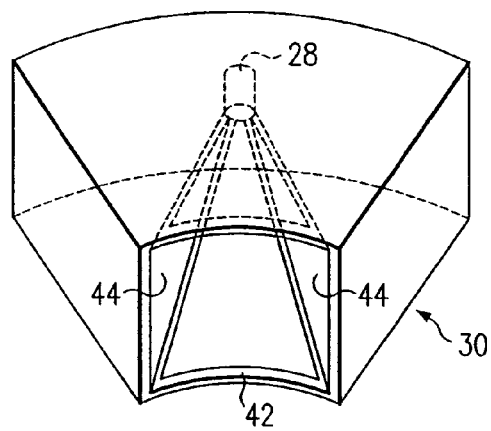

FIGS. 5A and 5B illustrate a perspective and cross-sectional view of an example embodiment of receptacle 30 having straight sloped sidewall 44. Straight sloped sidewalls 44 may include various degrees of slopes on the interior wall of receptacle 30. In certain embodiments, the various slopes may include angle of slope 29. Angle of slope 29 may be measured from a plane perpendicular to an axis of opening 28 to a slope on the interior wall. Preferably, angle of slope 29 for straight sloped sidewall 44 includes wall slopes formed by angles measuring between twenty degrees and sixty degrees.

As the fluid medium enters centrifugal core 20, the centrifugal force imparted on the fluid medium may separate the more dense particles by forcing the particles towards opening 28 in fluid separation wall 26. The more dense particles may enter receptacle 30 at receptacle entrance 42. Receptacle 30 may include straight sloped sidewall 44 to create a centrifugal force that is uniform along the slope of the sidewall as it leads towards opening 28. The increasing centrifugal force on the more dense particles allows separation at a uniform rate as the more dense particles are accelerated towards opening 28.

By increasing angle of slope 29 to create a steeper sloped wall, the more dense particles may move more rapidly with the centrifugal force towards opening 28. In contrast, decreasing angle of slope 29 on receptacle 30 may increase frictional forces between the more dense particles on straight sloped sidewall 44 as the more dense particles move towards opening 28. The increasing frictional force may be caused by the increase in centrifugal force as the more dense particles move farther away from axis of rotation 36.

Figure 6A:
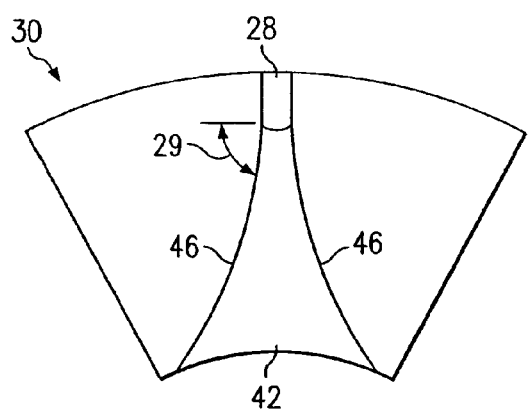
FIGS. 6A and 6B illustrate a perspective and cross-sectional view of an example embodiment of a receptacle having a compound curved sidewalls according to the teachings of the present invention.
Figure 6B:
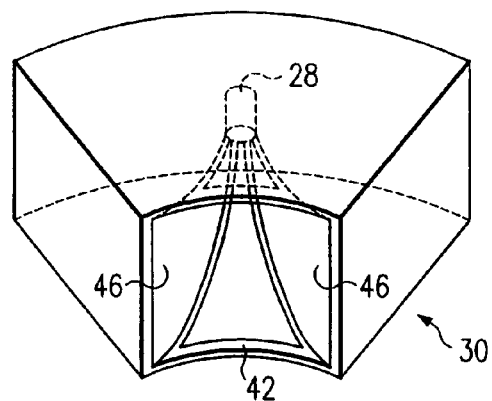

FIGS. 6A and 6B illustrate a perspective and cross-sectional view of an example embodiment of receptacle 30 having a compound curved sidewall 46. Compound curve sidewall 46 may include varying angles from receptacle entrance 42 to opening 28. In certain embodiments, compound curve sidewall 46 may include angle of slope 29. Angle of slope 29 may vary from receptacle entrance 42 leading down to opening 28. The varying degrees of angle of slope 29 may include a range of less than or equal to ninety degrees formed near opening 28 to an angle of approximately thirty-seven degrees near the receptacle entrance 42. These varying degrees along the wall may create a frictional force that is greater at receptacle entrance 42 than near opening 28.

Depending on angle of slope 29 forming compound curved sidewall 46, more dense particles from the fluid medium may encounter high frictional wall forces resulting in a slower separation rate from the fluid medium. As these more dense particles move down along receptacle 30 towards opening 28, the wall frictional force may decrease due to an increase in angle of slope 29 on compound curved sidewall 46. This increase may result in a reduction in the frictional force imparted on the more dense particles as they move down receptacle 30 towards opening 28. In addition to the reduction of frictional force, the centrifugal force imparted on the more dense particle may increase as the distance from axis of rotation 36 increases. The centrifugal force combined with the increasingly steep angle of compound curved sidewall 46 may cause the more dense particles to accelerate. As the particles near the opening 28, the more dense particles may have minimal wall friction compared to the outward centrifugal force. As the particles enter opening 28 of receptacle 30, the frictional force may be insignificant compared to the centrifugal force causing the more dense particles to become densely packed at the exit of opening 28. This compaction of more dense particles near the exit of opening 28 may provide additional clarification of the fluid medium due to the compaction being under high pressure. Because the extracted clarified fluid is less dense, the fluid may be forced towards center of centrifugal core 20 near the axis of rotation 36. However, the more dense particles may be expelled through opening 28 to be deposited in accumulation area 18.

Figure 7A:
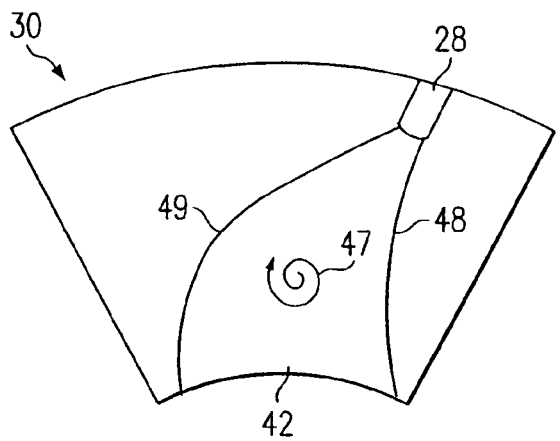
FIGS. 7A and 7B illustrate a perspective and cross-sectional view of an example embodiment of a receptacle having a shallow sloped wall and a steep sloped wall according to the teachings of the present invention.
Figure 7B:
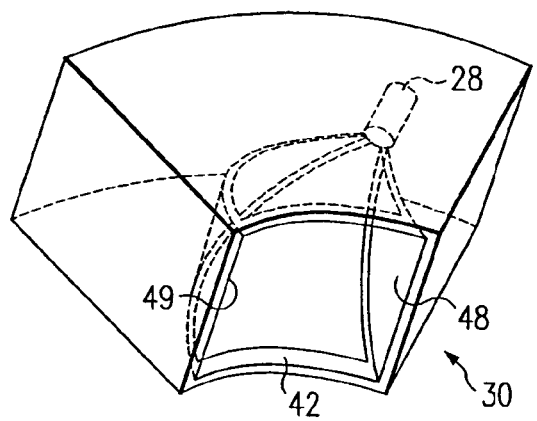

FIGS. 7A and 7B illustrate a perspective and cross-sectional view of an example embodiment of receptacle 30 having steep sloped sidewall 48 and shallow sloped sidewall 49 formed on inner surface 38 of fluid separation wall 26. As the fluid medium enters receptacle 30 at receptacle entrance 42, cyclonic vorticity 47 may be created by the rotation of centrifugal core 20 around axis of rotation 36. Cyclonic vorticity 47 may form a swirling motion within inner surface 38 of void area 32 due to the inertial effects of the fluid medium being accelerated around axis of rotation 36. Because receptacle 30 may include the two curved walls, namely steep sloped sidewall 48 and shallow sloped sidewall 49, each wall may be differently affected by cyclonic vorticity 47. In certain embodiments, cyclonic vorticity 47 causes the more dense particles to be swept away from shallow sloped sidewall 49 towards opening 28. Alternatively, the more dense particles falling along steep slope sidewall 48 towards opening 28 may have sufficient velocity and force to overcome the effects of cyclonic vorticity 47.

Aided by cyclonic vorticity 47, receptacle 30 may encourage these differing velocities of the more dense particles exiting through opening 28 creating different flow rates. These differing flow rates may prevent the development of a clog within opening 28. Additionally, the force of the faster particles may also aid in breaking apart any particles beginning to form a plug in opening 28.

Figure 8A:
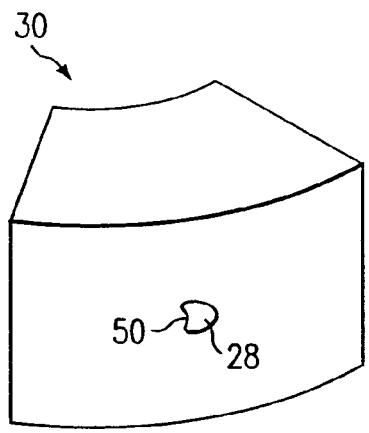
FIGS. 8A and 8B illustrate two perspective views of example embodiments of an opening formed in a receptacle on the interior wall of the centrifugal separator according to the teachings of the present invention.
Figure 8B:
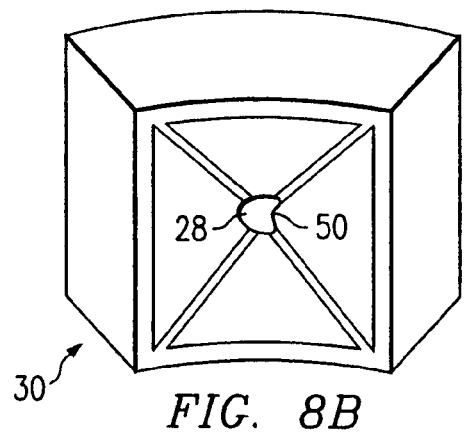

FIGS. 8A and 8B illustrate two perspective views of an example embodiment of anti-clogging projection 50 formed on the interior wall of opening 28 located in receptacle 30. Incorporating anti-clogging projection 50 with opening 28 may create a keystone effect by providing a differential flow rate through opening 28 to reduce the possibilities of clogging. The keystone effect may describe the effect anti-clogging projection 50 imparts to the fluid medium as the more dense particles flow through opening 28. The anti-clogging effect may disrupt the formation of a clog within opening 28. Typically, anti-clogging projection 50 creates a differential flow rate through opening 28 such that removal of any small portion of a potential clog, namely a keystone, results in a fracture or break down of the potential clog.

Anti-clogging projection 50 may be any formation or internal shape placed in combination with opening 28. The internal shape formed may include any shape suitable for causing the differential flow rate through opening 28. In one embodiment, anti-clogging projection 50 includes a notch extending the length of opening 28. In an alternative embodiment, anti-clogging projection 50 includes an enlargement within opening 28 to create a differential flow rate along opening 28.

Figure 9A:
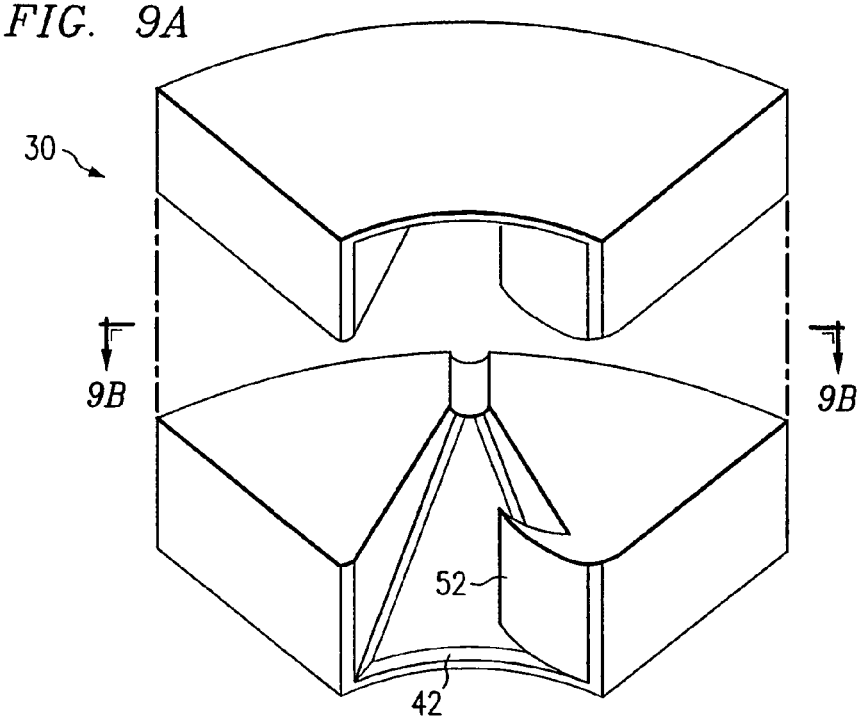
FIGS. 9A and 9B illustrate a perspective and cross-sectional view of a receptacle including an example embodiment of an anti-vorticity projection formed on the inner surface of the receptacle according to the teachings of the present invention.
Figure 9B:
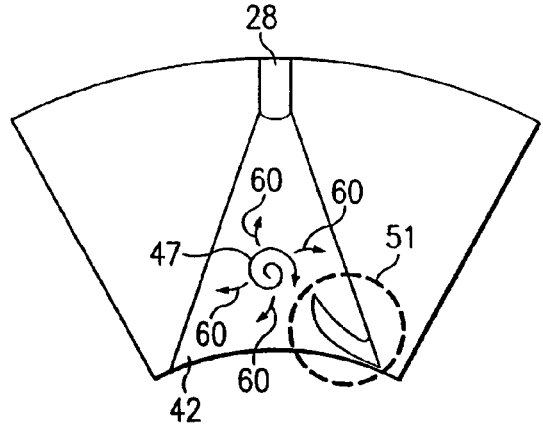

FIGS. 9A and 9B illustrate a perspective and cross-sectional view of receptacle 30 including an example embodiment of anti-vorticity projection 52 formed on inner surface 38. Cyclonic vorticity 47 caused by the rotation of centrifuge 10 may be disrupted with the use of anti-vorticity projection 52. Anti-vorticity projection 52 may extend into void area 32 of receptacle 30. Anti-vorticity projection 52 may include any shape or protrusion extending into void area 32 of receptacle 30 that creates chaos 60 within the fluid medium. Chaos 60 may include any alteration, disruption, modification, reduction, or acceleration of the flow pattern of the fluid medium created by cyclonic vorticity 47 or any other flow pattern in the fluid medium.

In some embodiments, anti-vorticity projection 52 includes a hook-like shape positioned near receptacle entrance 42 and extending into void area 32. This hook-like shape may be multi-sided, pointed, conical, or any other shape suitable to create chaos 60 within receptacle 30. In some embodiments, anti-vorticity projection 52 may cause a disruption of cyclonic vorticity 47 by disrupting the fluid path within void area 32. The disruption may cause a back flow of fluid current against cyclonic vorticity 47, thus disbursing the cyclonic flow. In other embodiments, receptacle 30 may include one or more anti-vorticity projections 52 on inner surface 38 of receptacle 30. Anti-vorticity projection 52 may include a hook-like shape, a pointed shape, a square shape, a combination of shapes, or any other shape suitable to cause a disruption of cyclonic vorticity 47 within void area 32. Example embodiments of some anti-vorticity projections 52 are shown in breakout portion 51.

Figure 10A:
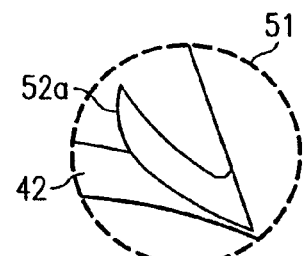
FIGS. 10A through 10C illustrate example embodiments of various anti-vorticity projections formed in a receptacle according to the present invention.
Figure 10B:
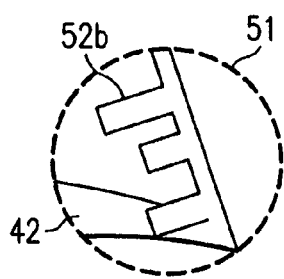
Figure 10C:
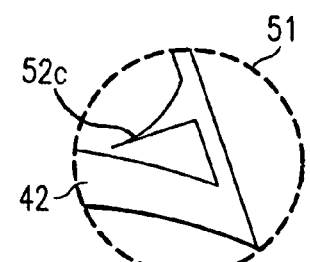

FIGS. 10A–10C illustrate breakout portion 51 having example embodiments of various anti-vorticity projection 52 formed in receptacle 30. Hook-like projection 52a may include a long finger-like projection into void area 32 of receptacle 30 to disrupt cyclonic vorticity 47. Square projections 52b and pointed projection 52c may also be used to create chaos 60 within void area 32. Disrupting cyclonic vorticity 47 may allow for greater separation of more dense particles from the fluid medium.

Figure 11:
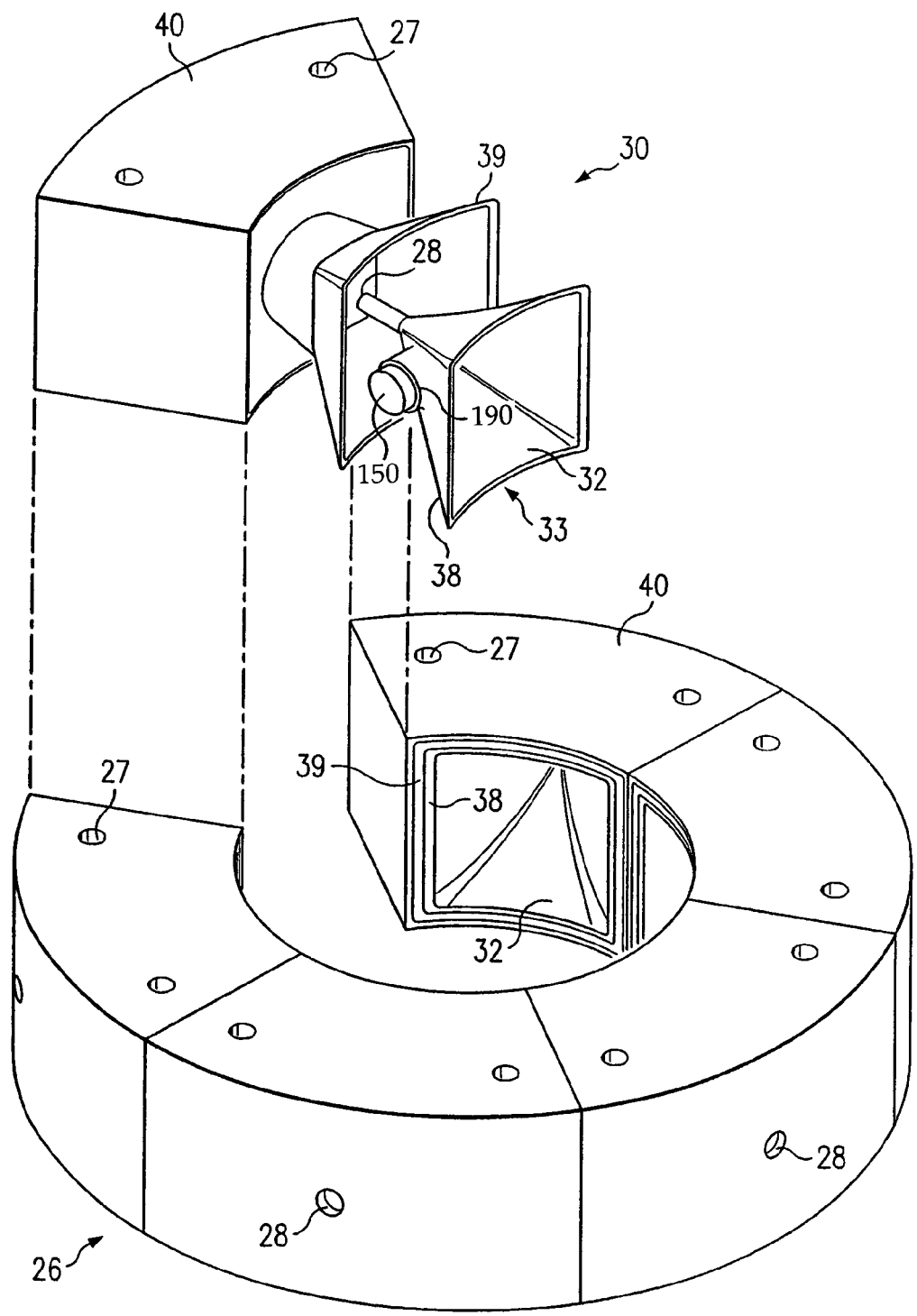
FIG. 11 illustrates an exploded perspective view of a receptacle having an electromechanical excitation device forming a part of a fluid separation wall according to an example embodiment of the present invention.

FIG. 11 illustrates an exploded perspective view of receptacle 30 having electro-mechanical excitation device 150 forming a part of fluid separation wall 26. In certain embodiments, electro-mechanical excitation device 150 may associate with one or more receptacle 30 formed in a circular pattern around axis of rotation 36 as shown by looking into clarified fluid entrance 16.

Fluid separation wall 26 may be formed from one or more receptacles 30 arranged symmetrically about axis of rotation 36. Receptacles may be connected either horizontally or vertically to form separation wall 26. Preferably, fluid separation wall 26 includes a plurality of receptacles 30 arranged horizontally to form a generally cylindrical configuration such as a toroidal. Each receptacle 30 in fluid separation wall 26 may include outer shell 40, middle layer 39, inner surface 38, opening 28, and an excitation device such as electro-mechanical excitation device 150 deposited in receptacle 30.

Excitation apparatus may be used to create vibrations within receptacle 30. Excitation apparatus may develop vibrations that vary in frequency and amplitude depending on the fluid medium and the separation process. The frequency of excitation apparatus may range from 100 hertz (Hz) to 40,000 Hz such that the higher frequency causes more vibration cycles per second. The amplitude of vibrations may range from 0.1 milliwatt to 150 kilowatts such that the greater the amplitude power increases the effect of each vibration cycle.

Additionally, the excitation apparatus may be operated in a continuous mode to provide constant vibrations while the centrifuge is operating. Cyclic operation of the apparatus may provide intermittent vibrations to receptacles 30. However, in some embodiments, the excitation apparatus may use condition responsive operations to activate vibrations within receptacle 30, depending on the operating conditions within each receptacle 30 or centrifuge 10. For example, a condition responsive operation may count particulate matter in an extracted fluid stream to activate the excitation apparatus when the particulate count is too low.

In some embodiments, excitation apparatus operates to create a "slippery wall" effect on inner surface 38. The "slippery wall" effect may reduce the frictional effect of the walls on more dense material thus allowing more dense material to proceed to opening 28.

In another embodiment, the excitation apparatus may increase the rate of more dense material entering opening 28. Because large quantities of more dense material may simultaneously enter opening 28, a build up of more dense material may form within opening 28. As the build up of more dense material compacts within opening 28, less dense fluids or materials entrained with more dense material may be "squeezed" or extracted from the fluid medium.

In other embodiments, excitation device 150 may be placed on inner surface 38 near opening 28. Excitation device 150 placed near opening 28 may break up any compactions of more dense material that may form within opening 28 causing more dense material being ejected through opening 28 to containment area 18.

To further aid in separation, receptacle 30 may include respective geometry 32 and respective shape 33. Respective shape 33 of inner surface 38 may aid in separation of more dense material by causing frictional forces to develop between the walls of inner surface 38 and more dense material. Respective shape 33 may vary depending upon the fluid medium and the desired separation properties. For example, respective shape 33 having shallow walls (e.g., walls with very little slope leading to opening 28) may hinder the movement of more dense material to opening 28 due in part to the high friction walls, which may allow for additional de-watering of more dense material.

Excitation device 150 may couple to inner surface 38 to provide a vibration on the wall of inner surface 38 to affect this frictional force. In some embodiments, excitation device 150 may be deposited within the fluid medium.

Respective geometry 32 may be formed on the interior wall of wall of fluid separation wall 26 to aid in the separation of the fluid medium by increasing the available separation area within centrifuge 10. In certain embodiments, receptacle 30 may be formed in combination with several receptacles 30 having corresponding respective geometries and arranged in a honeycomb fashion as permitted by respective shape 33. In another embodiment, receptacle 30 may be arranged to include an area of eighty percent or higher of the total surface of fluid separation wall 26 depending upon respective geometry 32 associated with receptacle 30. Depending upon the application requiring centrifugal separation, fluid separation wall 26 may include combinations of different shaped receptacles 30 formed on inner surface 38. In further embodiments, receptacle 30 may comprise a combination of the different geometries and shapes to form fluid separation wall 26.

Figure 12:
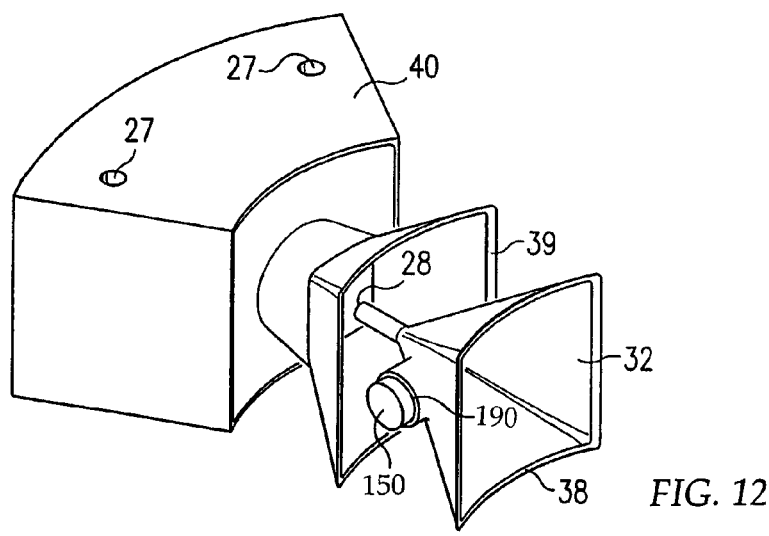
FIG. 12 illustrates an exploded perspective view of a receptacle defined in part by an outer segment, a middle layer, and an inner surface including the electro-mechanical excitation device incorporating teachings of the present invention.

FIG. 12 illustrates an exploded perspective view of receptacle 30 defined in part by outer shell 40, middle layer 39, and inner surface 38 including electro-mechanical excitation device 150. In certain example embodiments, electromechanical excitation device 150 may form a part inner surface 38. Location of excitation device 150 on inner surface 38 may be modified depending on respective shape 33, direction of rotation of centrifuge 10, centrifuge application, et cetera. Typically, electromechanical excitation device 150 includes a piezo-electric transducer, a magnetic device or any other device able to produce vibrations.

In certain embodiments, inner surface 38 may include mounting surface 190 that may form a part of inner surface 38. Mounting surface 190 may associate electro-mechanical excitation device 150 with inner surface 38. Mounting surface 190 may also be used to orient excitation device 150 for correct installation and/or operation.

Additionally, mounting surface 190 may include electrical attachments such as electrical power, activation switch, or electrical components for adjusting/tuning the vibratory effect. Typically, excitation apparatus is electrical powered including alternating and direct current (e.g., battery power). In other embodiments, excitation device may also be powered by magnetic sources, pneumatic sources, or any other sources operable to generate a vibration.

Excitation device 150 may be activated by various means including automatic and manual controls that may be either human or computer controlled. For example, a pressure sensor (not expressly shown) may indication high pressure within receptacle 30 that may automatically cause computer controls to activate excitation device 150. In one embodiment, a pressure switch placed in the receptacle 30 may activate excitation device 150 as pressure within receptacle 30 increases beyond a set point.

Other activation devices may include computer or other electronic devices able to monitor the operation of separator 10 to activate the excitation device. In some embodiments, each receptacle 30 may activate independently from other receptacles 30. However, in one example embodiment, an electronic device measures the moisture content of the separated more dense material. Any change in the moisture content from a pre-defined set point may activate the vibration devices in all receptacles 30.

Excitation apparatus may create vibrations within receptacle 30 under operating conditions. In some embodiments, vibrations may be continuous during the operations of centrifuge 10. However, under different operating conditions, vibrations may be cycled on and off depending upon the operating conditions. Additionally, vibrations may be applied in a random fashion (e.g., intermittently creating vibrations).

Figure 13:
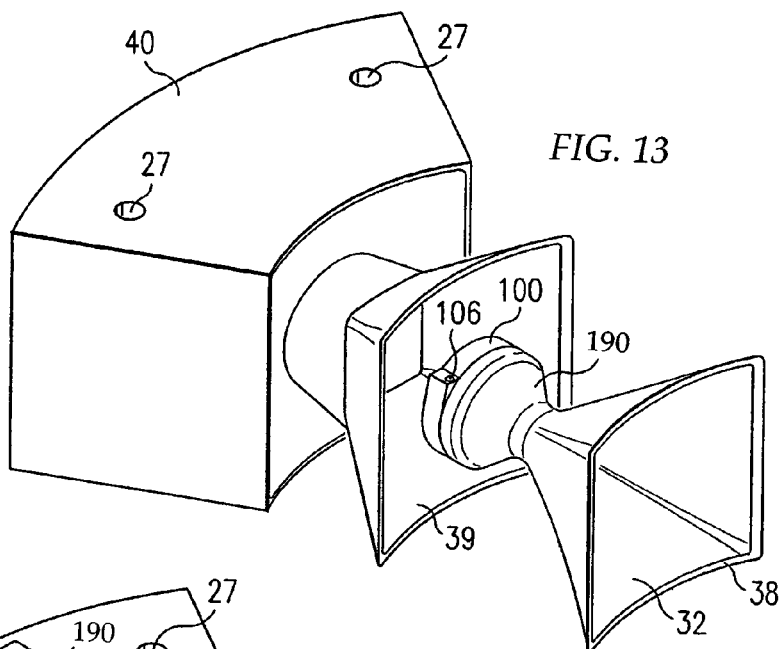
FIG. 13 illustrates an exploded perspective view of an example embodiment of a ball raceway excitation device attached to a receptacle incorporating teachings of the present invention.

FIG. 13 illustrates an exploded perspective view of an example embodiment of ball raceway excitation device 100 attached to receptacle 30. As shown, ball raceway excitation device 100 may be formed near opening 28.

Ball raceway excitation device 100 may be formed from a substantially circular track or raceway that contains an object (e.g., a ball) placed in the track. Vibrations are generated as the object travels around the track due to the forces used to keep the object within the track. Because the forces are applied to at a separate location on the track at any given time, vibrations are generated in a direction radial from the track.

As shown, ball raceway excitation device 100 may rotate in a substantially circular path around opening 28. The circular path may create vibrations in a substantially perpendicular direction to the exiting more dense fluid. In one embodiment, vibrations from ball raceway excitation device 100 may aid in breaking up any build up of more dense material within opening 28. Depending upon the desired separation, vibrations may be created in any direction such as an axial vibration, radial vibration, linear vibration, torsional vibration, arced vibration, or any other vibration direction able to induce a vibration effect in receptacle 30.

Figure 14:
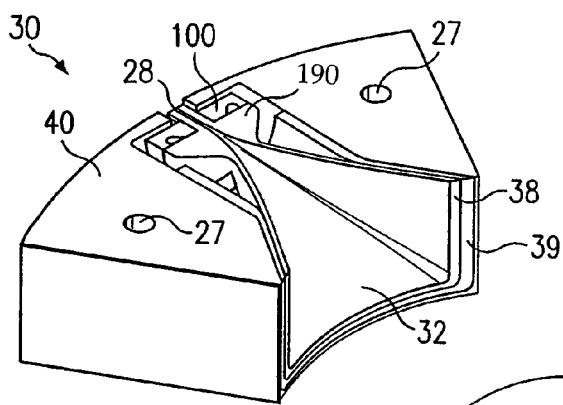
FIG. 14 illustrates a cross-sectional view of the receptacle having the ball raceway excitation device as shown in FIG. 13.

FIG. 14 illustrates a cross-section view of receptacle 30 having ball raceway excitation device 100 as shown in FIG. 13. In certain example embodiments, vibratory device 100 may be mounted on mounting surface 190 such as a flange that is formed as a part of inner surface 38.

Mounting surface 190 may be formed as a part of inner surface 38 to aid in the placement of ball raceway excitation device 100. In some embodiments, mounting surface 190 may be used to provide an orientation direction for installing ball raceway excitation device 100. In other embodiments, mounting surface 190 may provide an attachment for electrical power or vibration sensor for monitoring excitation device 100.

Additionally, mounting surface 190 may be used to direct vibrations to inner surface 38. Because ball raceway excitation device 100 rotates in a substantially circular path around the flow path exiting opening 28, vibrations are typically directed to opening 28 to break up any congestion of more dense materials. In other embodiments, vibrations generated by ball raceway excitation device 100 may be directed to the fluid medium within receptacle 30 to aid in separation of more dense fluid.

Figure 15:
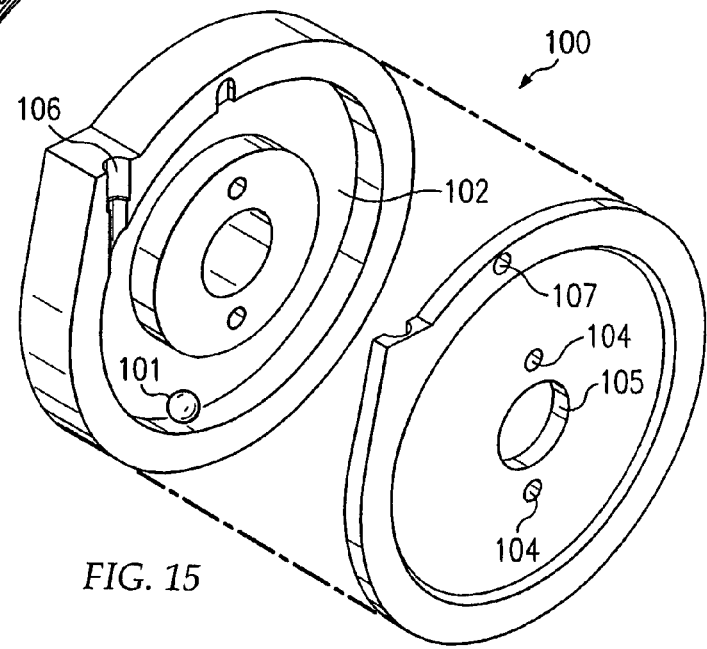
FIG. 15 illustrates a perspective cross-sectional view of the ball raceway excitation device according to the teachings of the present invention.

FIG. 15 illustrates a perspective cross-sectional view of ball raceway excitation device 100. In certain embodiments, ball raceway excitation device 100 may include ball 101 formed in race 102 that rotates in an orbital path perpendicular to opening 28. Air inlet 106 may provide a compressed air or other fluid to drive ball 101 within race 102. Excitation device 100 may include mounting holes 104 to mate with pins (not expressly shown) on mounting surface 190 to prevent excitation device 100 from rotating around opening 28 during operation.

Air or any other driving fluid may enter through air hole 106 to drive ball 101 around race 102. Relief hole 107 allows the air to escape from race 102 creating an air path from air hole 106 to relief hole 107. Pressure from the air flowing through the air path may drive ball 101 around race 102. Although race 102 may be shown in a circular pattern, race 102 also may be in a substantially elliptical or orbital pattern around hole that may be used to set up a vibratory effect around opening 28.

Figure 16:
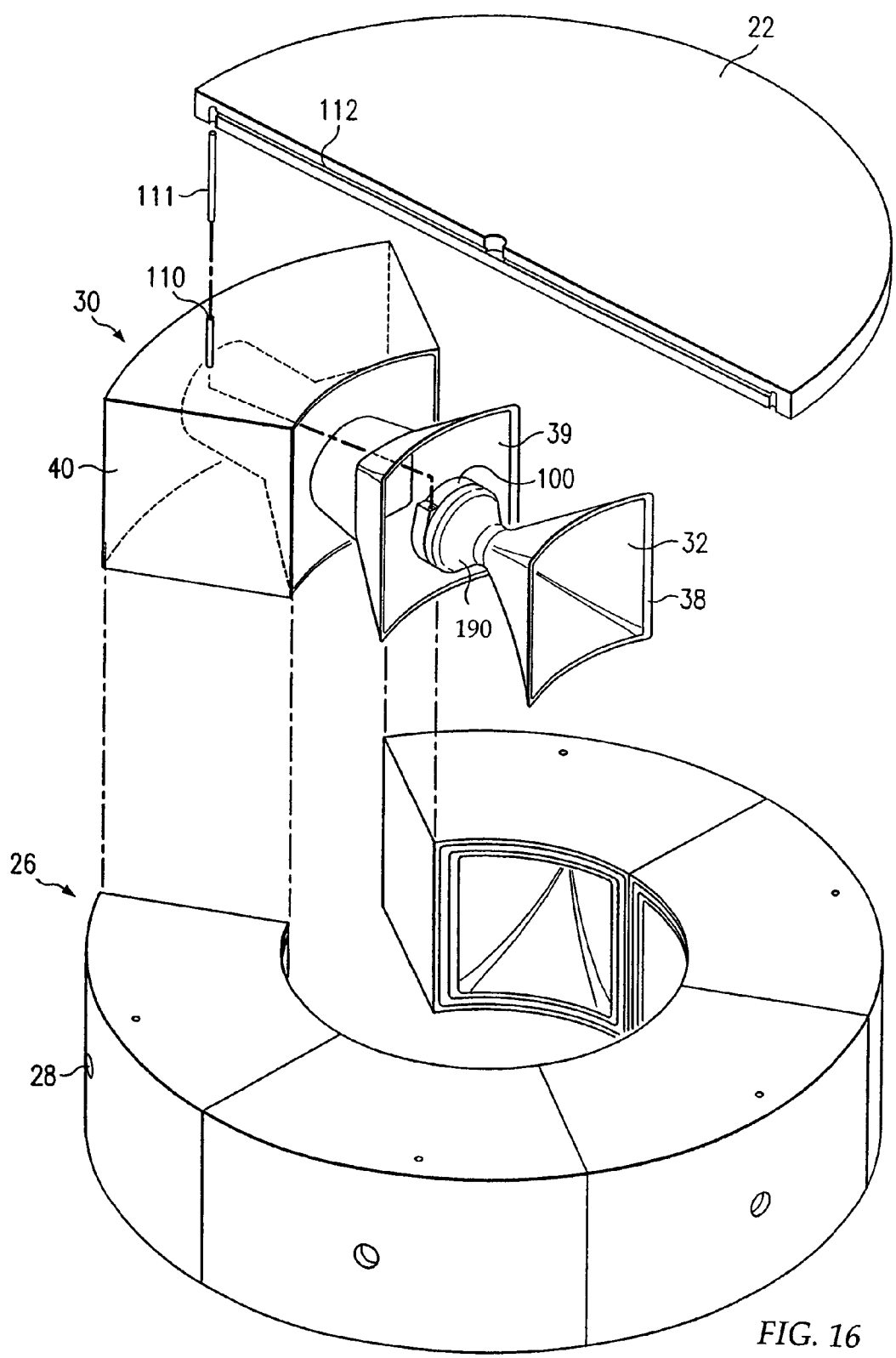
FIG. 16 illustrates a perspective exploded view of a central air system used to activate the ball raceway excitation device according to the teachings of the present invention.

FIG. 16 illustrates a perspective exploded view of central air system 105 used to activate ball raceway excitation device 100. In an example embodiment, central air system 105 supplies air to each receptacle 30 for powering excitation device 100. Central air system 105 may be used to drive multiple excitation devices 100 in centrifuge 10. Central air system 105 may control the vibratory effects by increasing and/or decreasing the operating pressure of the air.

As shown, central air system 105 may supply air or any other fluid medium through distribution line 112. Distribution line 112 may attach with rotating line connection 113 to receive air from an outside source. Air enters rotating line connection 113 and may be separated into several distribution lines 112 to supply air to a single receptacle or a group of receptacles.

In one example embodiment, distribution line 112 connects with feed line 111. Feed line 111 may connect directly with air opening 106 of excitation device 100 through receptacle air opening 110. In another example embodiment, air feed line 111 may extend to another receptacle positioned adjacent to this receptacle.

Figure 17D:
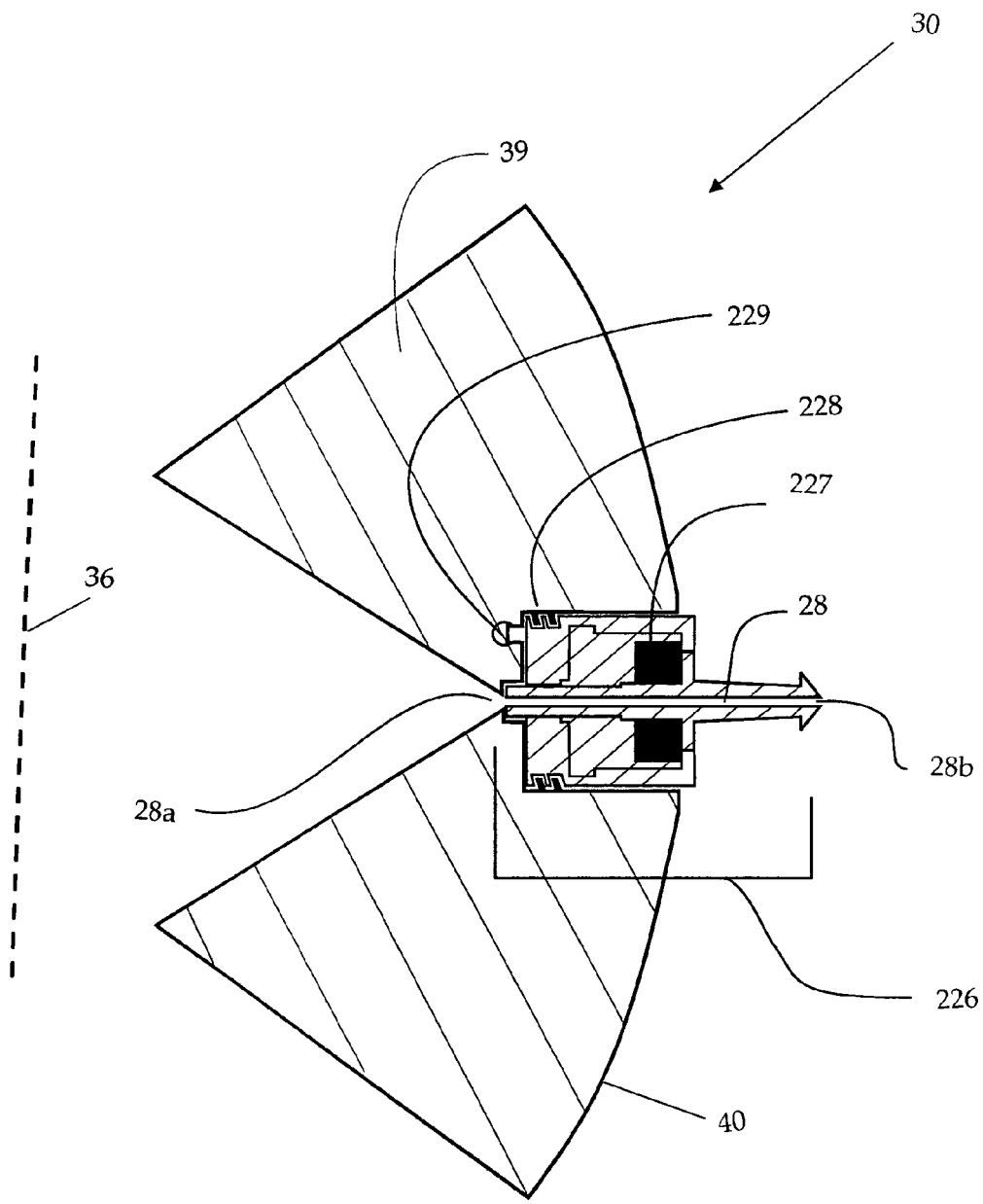

FIGS. 17A through 17D illustrate other example embodiments of excitation devices placed at various locations in receptacle 30. Referring to FIG. 17A, wall/fluid excitation device 220 may be formed on inner surface 38 of receptacle 30. In one embodiment, wall/fluid excitation device 220 extends into the fluid medium and may, in some instances, contact the fluid medium with projection 221. Wall/Fluid excitation device 220 may create a vibration effect not only within the fluid but also along inner surface 38. Projection 221 may further be operable to create a disruption within receptacle 30. The disruption may be used to prevent clogging of opening 28.

Referring to FIG. 17B, nozzle excitation device 222 may be formed around opening 28. Nozzle excitation device 222 may be formed to remove the congestion of more dense fluid that has compacted in opening 28. In this instance, nozzle excitation device 222 may form a part of both opening 28 and excitation apparatus.

Referring to FIG. 17C, extension excitation device 224 may extend from centrifugal core 225 into receptacle 30. In some embodiments, extension excitation device 224 causes a vibratory effect in the fluid medium. The vibratory effects may be transmitted through the medium to inner surface 38 of receptacle 30. In certain embodiments, extension excitation device 224 creates a slippery effect on inner surface 38 causing more dense material to move to opening 28.

Referring to FIG. 17D, ultrasonic excitation nozzle 226 may contain an excitation device and a nozzle that forms a portion of opening 28. Generally, ultrasonic excitation device 226 is a commercially available ultrasonic spray nozzle that is able to prevent the clogging of an outlet passage, such as opening 28, while allowing the ejection of more dense material in a stream formed in a broad and evenly spaced dispersal pattern. In one example embodiment, ultrasonic excitation nozzle 226 includes a Sono-Tek nozzle such as a Sono-Tek ultrasonic nozzle available from Sono-Tek Corporation of Milton, N.Y.

Typically, ultrasonic excitation nozzle 226 couples with respective receptacle 30 at an attachment point, such as threaded connector 228. Once placed with receptacle 30, ultrasonic excitation nozzle 226 may connect to a power source (not expressly shown) via electrical connection 229 to supply power to the ultrasonic vibration inducing element 227. When activated, ultrasonic vibration inducing element 227 may be able to create vibrations at a frequency greater than 20,000 cycles per second, or Hertz (Hz).

Because ultrasonic vibration inducing element 227 may be formed around opening 28, the more dense material that enters nozzle opening 28a, may be subjected to the ultrasonic vibrations. When ultrasonic vibration inducing element 227 is deactivated, the more dense material may compact within nozzle opening 28 such that additional clarified fluid can be removed from the fluid medium. Upon activation such as supplying power to ultrasonic vibration inducing element 227, vibrations may be directed at opening 28 causing it to vibrate at an ultrasonic frequency that causes the compacted more dense material to unclog and become ejected from opening 28 via opening exit 28b. By using an actuation device (not expressly shown) to intermittently cycle or supply power for the operation of ultrasonic vibration inducing element 227, ultrasonic excitation nozzle 226 may be able to act as a non-mechanical valve that controls the flow of more dense material moving along the flow path through opening 28.

FIGS. 18A–18D illustrate various opening respective geometries 32 for receptacle 30 for use with various excitation devices. Depending on a particular separation application, receptacle 30 may include a variety of respective geometries 32 formed on the opening of inner surface 38. Typically, receptacles 30 are arranged in a honeycomb fashion along inner surface 38 of fluid separation wall 26 to separate more dense material from the fluid medium.

Figure 18A:
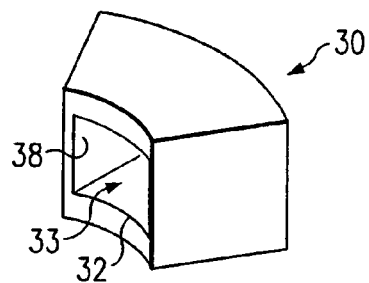
FIGS. 18A–18D illustrate various opening geometries for a receptacle for use with various excitation devices according to the present invention.
Figure 18B:
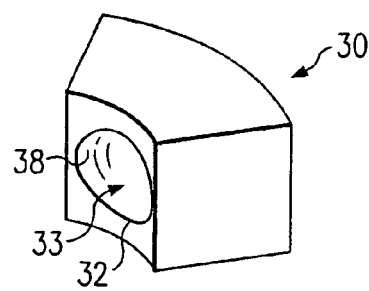
Figure 18C:
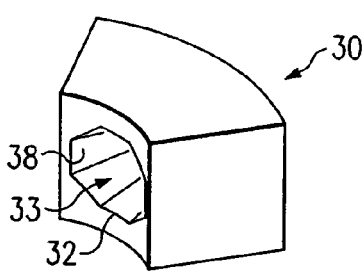
Figure 18D:
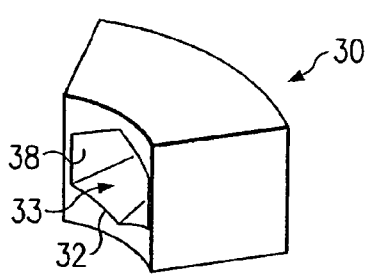

Depending upon the application of the fluid separation, respective geometry 32 selected may include four-sided receptacle, as shown in FIG. 18A, circular receptacle, as shown in FIG. 18B, a hexagonal receptacle, as shown in FIG. 18C, or any multi-sided receptacle, such as a pentagonal receptacle, as shown in FIG. 18D. Other respective geometries 32 of receptacle 30 formed on inner surface 38 may include a triangle, a square, a rectangular, a trapezoid, a diamond, a rhombus, a pentagon, a hexagon, an octagon, a circle, an oval, a multi-sided figure, or any other geometry suitable to form receptacle 30 on inner surface 38.

In some embodiments, receptacle 30 may include respective geometry 32 formed on the interior wall of fluid separation wall 26 having converging sloped walls leading from the interior surface of fluid separation wall 26 to a center opening 28 in the exterior portion of fluid separation wall 26. In certain embodiments, receptacle 30 may be formed with several receptacles 30 arranged in a honeycomb fashion. In another embodiment, receptacle 30 may be arranged to have an area of eighty percent or higher of the total surface of fluid separation wall 26. Depending upon the application requiring centrifugal separation, fluid separation wall 26 may include combinations of different shaped receptacles 30 formed on inner surface 38. In further embodiments, receptacle 30 may include a combination of different geometries and shapes to form fluid separation wall 26.

In addition to forming respective geometry 32, receptacle 30 may include a variety of respective shapes 33. Respective shape 33 of receptacle 30 formed in middle layer 39 may include a pyramidal, a triangular, a pentagonal, hexagonal, octagonal, trapezoidal, or any other multi-walled shape operable to provide a void area within fluid separation wall 26. Respective shapes 33 of receptacle 30 may further be defined to include curved walls, compound curved walls, steep sloped walls, shallow sloped walls, straight walls, flat walls, asymmetric shaped walls, irregular shaped walls, any combination thereof, or any other wall shape suitable to form receptacle 30 within middle layer 39.

FIGS. 19A–19D illustrate cross-sectional views of example embodiments of respective shapes 33 formed on inner surface 38 of receptacle 30 for use with the excitation device. Referring to FIGS. 11A and 11B, receptacle 30 may include straight sidewalls having shallow sloped sidewall 230 or steep sloped sidewall 235. Typically, straight sidewalls include various degrees of slopes on the inner surface 38 of receptacle 30. The angles of the slope may include any slope from approximately one-degree to approximately ninety degrees. Preferably, slope of sidewall includes angles measuring between twenty degrees and sixty degrees. Straight slope sidewalls allow for a uniform force to be generated along the walls that varies with the distance from axis of rotation. Thus, the increasing centrifugal force on more dense material allows separation at a uniform rate as more dense material accelerates towards opening 28.

By increasing the angle of slope to create steep sloped sidewall 235, more dense material may move more rapidly with the centrifugal force towards opening 28. In contrast, decreasing the angle of slope on receptacle 30 may increase frictional forces between more dense material on shallow sloped sidewall 230 as more dense material moves towards opening 28. The increasing frictional force may be intensified by the increase in centrifugal force as more dense material moves farther away from axis of rotation 36.

Figure 19A:
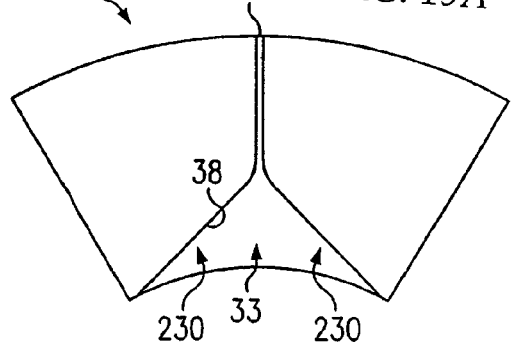
FIGS. 19A–19D illustrate cross-sectional views of example embodiments of respective shapes formed on an inner surface of a receptacle for use with the excitation device according to the teachings of the present invention.
Figure 19B:
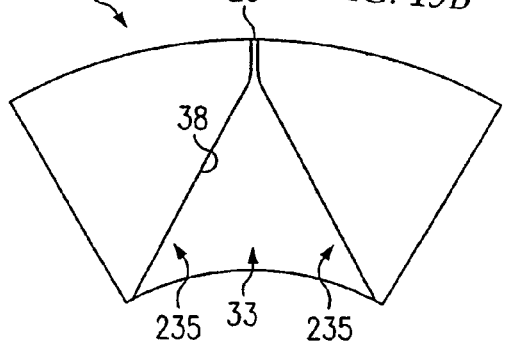
Figure 19C:
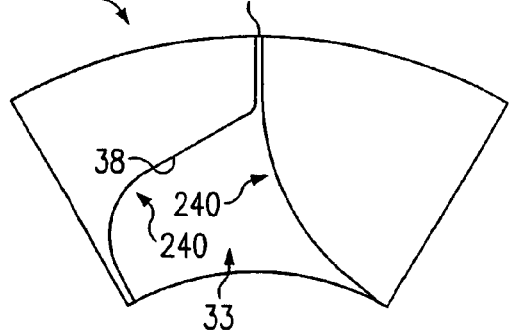

Referring to FIG. 19C, receptacle 30 may include curved sidewall 240. Curved sidewall 240 may be formed in part by walls of varying degrees of angles. In some embodiments, curved sidewall 240 may include a first wall substantially perpendicular to the flow path of more dense material and a second wall having varying degrees of angles leading to opening 28.

Second wall of curved sidewall 240 may have a steep slope near the entrance of receptacle 30 that imparts minimal frictional force on more dense material. However, as more dense material moves towards opening 28, the slope of the second wall may become shallower such that the wall imparts increasing frictional forces on more dense material. Slope of the second wall may be extremely shallow near opening 28 to reduce the velocity of more dense material thus permitting additional time for more de-watering of more dense material prior to expelling the material through opening 28 into accumulation area 18.

De-watering not only includes the process of removing water from a fluid medium but also may include any process for removing a first fluid medium from a second fluid medium.

Figure 19D:
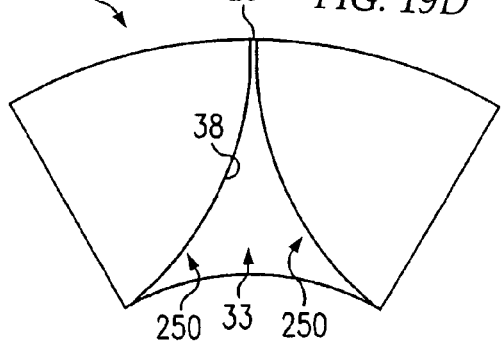

Referring to FIG. 19D, receptacle 30 may include fluted curved sidewall 250. Fluted curved sidewall 250 may include varying angles from entrance of receptacle 30 to opening 28. In certain embodiments, compound curve sidewall 250 may include an angle of slope. The angle of slope may vary from the entrance of receptacle 30 leading down to opening 28. The varying degrees of the slope may include a range of approximately ninety degrees formed near opening 28 to an angle of approximately thirty-seven degrees near the entrance of receptacle 30. These varying degrees along the wall may create a frictional force that is greater at entrance of receptacle 30 than near opening 28.

Depending on angle of the slope forming fluted curved sidewall 250, more dense material within the fluid medium may encounter high frictional wall forces at the entrance of receptacle 30 resulting in increased time for separation of more dense material from the fluid medium. As more dense material moves along the wall of receptacle 30 towards opening 28, the angle of the wall may decrease resulting in less wall friction. With less wall friction, the fluid medium moves more quickly along the wall towards opening 28 decreasing the amount of time for separation of more dense material from the fluid medium. However, as the friction is reducing due to the slope of the walls increasing, the centrifugal force may increase as the distance from axis of rotation 36 increases. Thus, the separation of more dense material from the fluid medium may depend on the centrifugal force and rate of separation within receptacle 30.

As more dense material enters opening 28 of receptacle 30, the frictional force may be insignificant compared to the centrifugal force causing more dense material to become densely packed at the exit of opening 28. This compaction of more dense material near the exit of opening 28 may provide additional clarification of the fluid medium due to the compaction being under high pressure. Because the extracted clarified fluid is less dense, the fluid may be forced towards center of centrifugal core 20 near the axis of rotation 36. However, more dense material may be expelled through opening 28 to be deposited in accumulation area 18.

Figure 20:
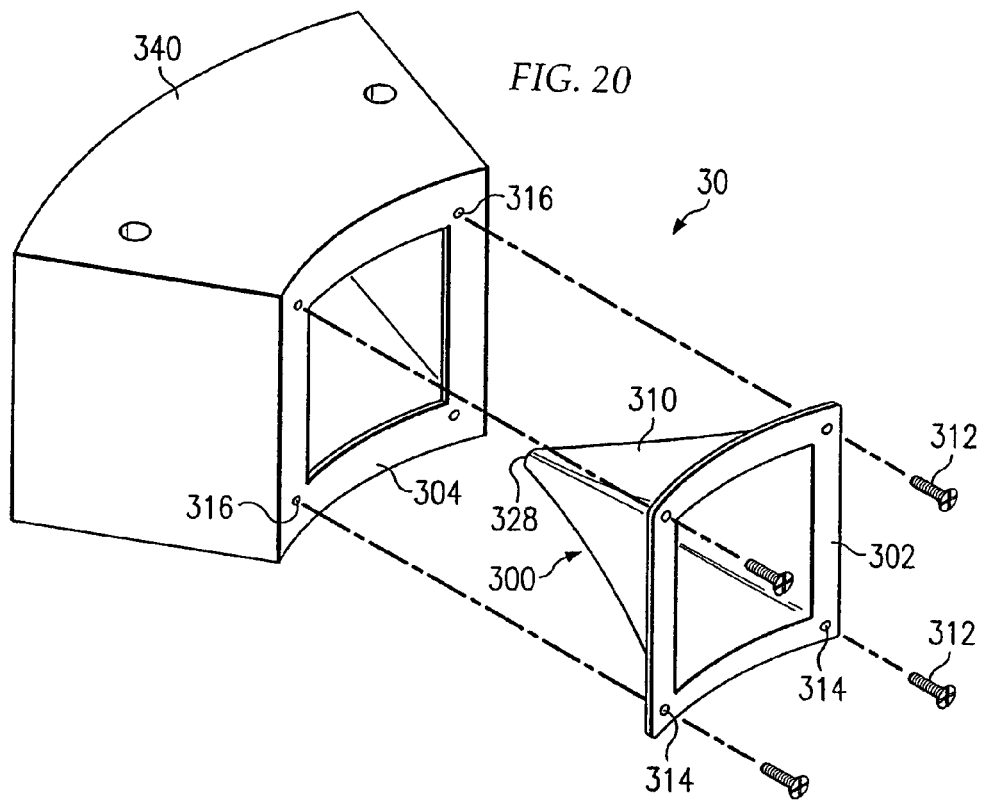
FIG. 20 illustrates a perspective exploded view of the receptacle defined in part by an inner shell and an outer shell segment according to the teachings of the present invention.

FIG. 20 illustrates a perspective exploded view of receptacle 30 defined in part by inner shell 300 and outer shell segment 340. Receptacle 30 may also include a replaceable receptacle such that a plurality of replaceable receptacles may form fluid separation wall 26. Typically, receptacle 30 includes excitation device 150 or any other device operable to create an excitation force within receptacle 30.

Inner shell 300 may form a portion of receptacle 30 such that inner shell 300 contacts the fluid medium. In some embodiments, inner shell 300 includes flanged surface 302, shell wall 310 and shell opening 328. Inner shell 300 may include respective geometry 32 formed in shell wall 310 and respective shape 33 to aid in the separation of more dense material from the fluid medium. Typically, inner shell 300 may be formed from flexible spring steel (e.g., thin stainless steel), flexible diaphragm, or any other material suitable to vibrate.

In some embodiments, flanged surface 302 provides support for inner shell 300 such that shell wall 310 and shell opening 328 are "free floating" within outer shell segment 340. Since shell wall 310 and shell opening 328 may be suspended without contacting outer shell segment 340, any excitation force applied to inner shell 300 may cause shell wall 310 and shell opening 328 to vibrate.

Outer shell segment 340 may be formed adjacent to outer sleeve 12 and be operable to receive inner shell 300. Typically, outer shell segment 340 includes mounting surface 304 that provides an attachment location for inner shell 300. In some embodiments, outer shell segment 340 includes mounting surface 304 that may be formed to receive and support inner shell 300.

Figure 21:
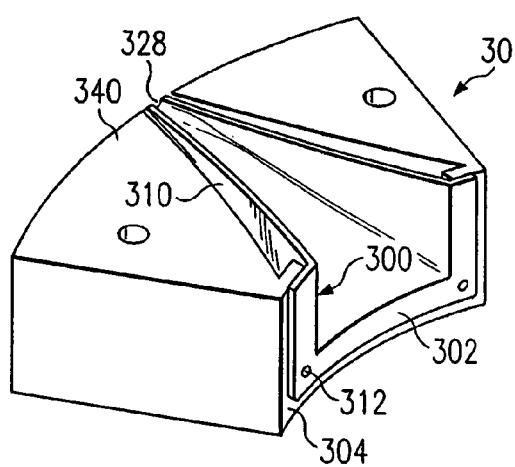
FIG. 21 illustrates a cross-sectional view of the receptacle including the inner shell attached to the outer shell segment as shown in FIG. 20.

FIG. 21 illustrates a cross-sectional view of receptacle 30 including inner shell 300 attached to outer shell segment 340 as shown in FIG. 20. Inner shell 300 may include flanged surface 302 designed to attach to mounting surface 304 formed on a portion of outer shell segment 340. Typically, flange surface 302 may be coupled to mounting surface 304 by mechanical means such as welding, soldering, screwing, or any suitable type of mechanical fasteners. For example, screw 312 may be inserted through screw opening 314 to connect with screw hole 316 to couple inner shell 300 to outer shell segment 340. Additionally, flanged surface 302 and mounting surface 304 may be attached with chemical means including adhesives or any other suitable type of means for attaching flange surface 302 to mounting surface 304.

Although inner shell 300 is illustrated with flange surface 304 having a large surface area for contacting outer shell segment 340, inner shell 300 may couple to outer shell segment 340 with any means to allow shell wall 310 and shell opening 328 to be supported within outer shell segment 340.

FIG. 22 illustrates a cross-sectional side view of a portion of fluid separation wall 26. In some embodiments, valve ring 450 is coupled to the outer periphery of fluid separation wall 26 such as outer surface 40.

In order to retain valve ring 450 over openings 28, valve ring 450 may be maintained or restricted in place using upper wedge 452 and lower wedge 454. By using upper wedge 452 and lower wedge 454, valve ring 450 in prevented from moving off center and is limited to rotational movements only. As such, upper wedge 452 and lower wedge 54 may be used to align valve ring 450 such that valve orifice 451 aligns with opening 28.

Figure 23A:
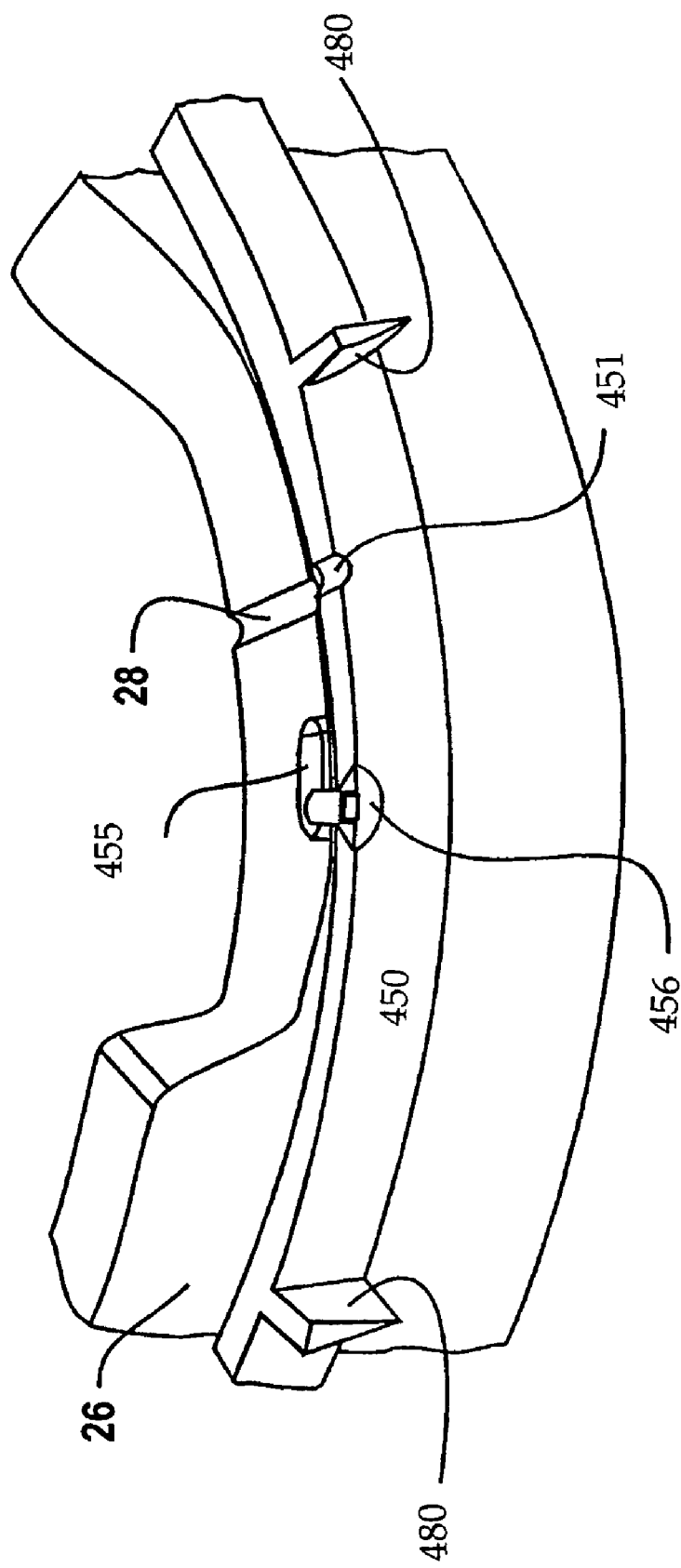
FIG. 23A illustrates a perspective view of the fluid separation wall with portions cut-away showing an example embodiment of a pin and slot arrangement for guiding the valve ring incorporating teachings of the present invention.

FIG. 23A illustrates a perspective view of fluid separation wall 26 with portions cut-away showing an example embodiment of a pin and slot arrangement for guiding valve ring 450. One example embodiment for guiding valve ring 450 to align valve orifices 451 with the respective openings 28 includes a pin or bolt 456 set into a guide or wall slot 455. In the present embodiment, the pin is represented by bolt 456. However, the pin may include other objects or structures operable to guide valve ring 450 within wall slot 455. Fluid separation wall 26 further illustrates vanes 80, as described below in more detail.

Wall slot 455 may include any void area, depression or other indention formed in fluid separation wall 26. In other embodiments, wall slot 455 is formed in outer surface 40 (not expressly shown). Wall slot 455 is typically formed in an oval-shaped pattern such that the elongated shape provides the direction of movement with restricted movement along the other direction.

Wall slot 455 is formed to receive a portion of pin or bolt 456. Typically, bolt 456 extends through valve ring 450 and into the void area of wall slot 455 such that the shape of wall slot 455 guides, limits and/or restricts the movement of valve ring 450. Generally, bolt 456 mounts or screws into valve ring 450 in a radially inward direction. Because bolt 456 is typically longer than the thickness of valve ring 450, a portion of bolt 456 extends into wall slot 455 formed in fluid separation wall 26. Once engaged, wall slot 455 guides valve ring 450 via pin or bolt 456 between the first position and the second positions such that valve orifice 451 aligns with respective opening 28 in the second position.

FIG. 23B illustrates a top cross-sectional view of an alternative example embodiment of the pin and slot arrangement for guiding valve ring 450. In the example embodiment, bolt 456 is secured through slot 458 and into the outer periphery of fluid separation wall 26 (e.g., outer surface 40). Although bolt 456 is illustrated as an example of a pin, the pin may include other objects or structures operable to guide valve ring 450 within slot 458.

Slot 458 may be formed in the oval-shaped pattern and used to guide the movements of valve ring 450. In one embodiment, valve ring 450 is free to move in relation to outer surface 40 in the direction of arrow B. Because slot 458 may include an oval shape, slot 458 may further guide, limit and/or restrict the movement of valve ring 450 such that valve orifice 451 maintains alignment with opening 28.

FIGS. 24 and 25 illustrate an example embodiment of split-cone fluid separation wall 60 including valve ring 450. Split-cone fluid separation wall 60 may include other types of centrifuge walls such as nozzle-type or disk type centrifuge walls. Similar to density screen type centrifuge 10, split-cone fluid separation wall 60 may be formed as a part of centrifuge core 20 for use with centrifuge 10 and include similar features as described above.

For example, receptacle 30 may be formed using the split cone design. In certain embodiments, split-cone fluid separation wall 460 may be formed with upper cone 462 that is coupled to lower cone 464. At the ends of the cones, openings 28 may be formed around the periphery of the mated cones. Similarly, valve ring 450 including valve orifice 451 may be fitted over opening 28 to control the release of more dense material from centrifuge 10.

FIG. 26 illustrates an exploded perspective view of a portion of fluid separation wall 26 including an example embodiment of self-adjusting wear nozzle 470 placed in opening sleeve 29. Typically, self-adjusting wear insert nozzle 470 is a removable nozzle insert that is fitted into opening sleeve 29. Generally, nozzle 470 may be constructed from materials including, but not limited to, metals, ceramics, gems or any other suitable material.

To prevent nozzle 470 from falling into void area 32, opening sleeve 29 may include seat 29a. Seat 29a may include a detent that is formed as part of opening 28. Generally, seat 29a and opening sleeve 29a are formed to allow nozzle 470 to slide radially within opening sleeve 29a but prevents nozzle 470 from falling into the inside part of centrifuge core 20.

During separation of the more dense materials, centrifugal force causes nozzle 470 to press against valve ring 450. The pressure of the centrifugal force allows nozzle 470 to form a good seal against valve ring 450. Over time, the outward force of nozzle 470 against valve ring 450 may cause a slight curved wear on the outer face of nozzle 470 that mates with the inside shape of valve ring 450 to maintain a good seal. Because valve ring 450 maintains nozzle 470 within opening sleeve 29, valve orifices 451, for this embodiment, are formed smaller than nozzle 470.

Figure 27:
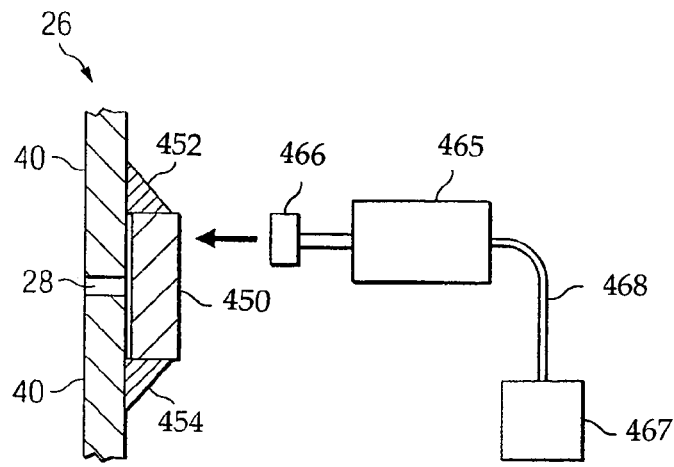
FIG. 27 illustrates a cross-sectional view of an example embodiment of the fluid separation wall including the valve ring that is actuated by a solenoid according to the teachings of the present invention.

FIG. 27 illustrates a cross-sectional view of an example embodiment of fluid separation wall 26 including valve ring 450 that is actuated by solenoid 465. In some embodiments, solenoid 465 may includes electric, mechanical, pneumatic or any other suitable solenoid. Generally, solenoid 465 is placed outside of centrifugal core 20 in the non-rotating area such as being coupled to non-rotating outer sleeve 12.

Brake pad 466 is coupled to the end of solenoid 465 such that upon actuation of solenoid 465, brake pad 66 extends onto the surface of valve ring 450. Typically, such actuation utilizes a momentary or instant switch that causes brake pad 466 to quickly contact and release valve ring 450. The contact causes valve ring 450 to move to between an open and a closed position. For example, valve ring 450 may move to an open position after being contacted with brake pad 466.

Controller 467 may be electrically coupled to solenoid 465 via cable 468. Controller 467 may be used to control the actuation of solenoid 465 based on a variety of predetermined conditions. The predetermined conditions may be used to move valve ring 450 between the first and second position (e.g., closed and open position). Examples of predetermined conditions include pressure levels within fluid separation wall 26, particle characteristics of a clarified fluid stream, a combination of both or any other condition including operating conditions that may be monitored to control the function of centrifuge 10.

In determining the pressure levels within fluid separation wall 26, a pressure sensor or monitor may be coupled to or attached to a portion of fluid separation wall 26 in order to monitor the pressures, as described below in one example embodiment of a pressure sensor. Similarly, particle characteristics may be monitored in the clarified stream using a particle sensor, as described below in more detail.

Valve ring 450 may also vary on the type of actuation or control of the movement. For example, controller 467 may actuate valve ring 450 using an automated actuation such as regular intervals, timed actuation, continuous actuation and intermittent actuation, or manual actuation.

Figure 28:
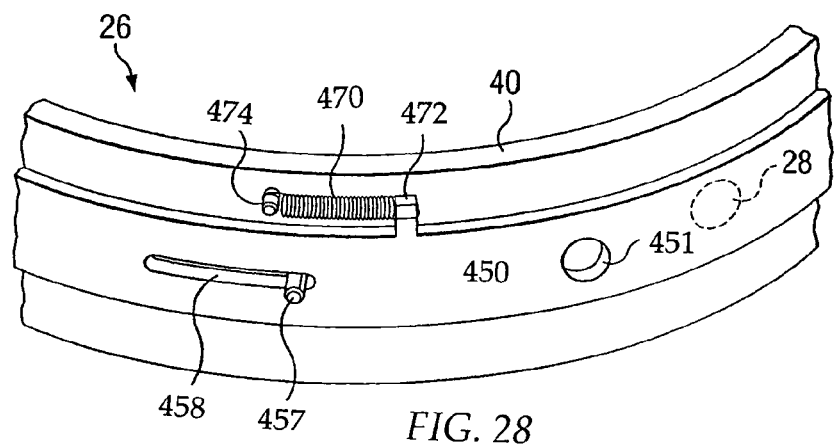
FIGS. 28 and 29 illustrate a perspective view of a portion of the fluid separation wall including the valve ring using a spring to maintain a biased position according to the teachings of the present invention.
Figure 29:
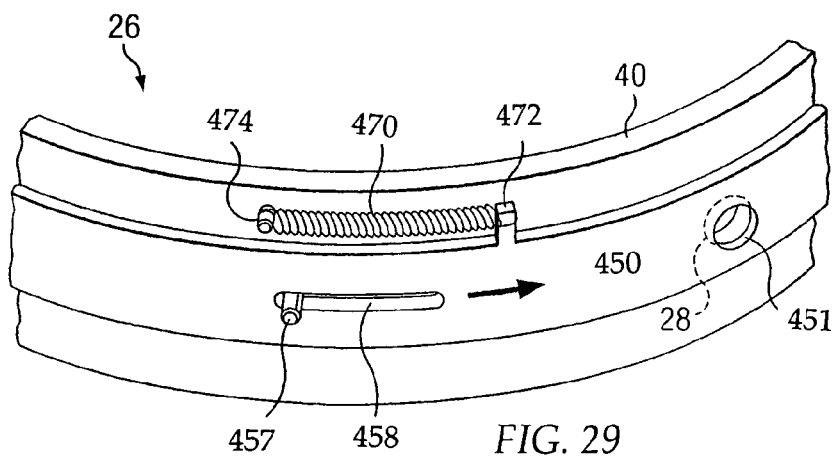

FIGS. 28 and 29 illustrate a perspective view of a portion of fluid separation wall 26 including valve ring 450 using spring 470 to maintain a biased position. In the example embodiment, spring 470 is coupled to fluid separation wall 26 (e.g., outer surface 40) at attachment point 474. The other end of spring 470 is connected to a portion of valve ring 450 such at ring connection point 472.

As illustrated in FIG. 28, spring 470 is biased to a closed position. In the closed position, valve orifice 451 is offset from opening 28. Being offset, valve ring 450 blocks the passage of more dense material from exiting opening 28.

In some embodiments, pin 457 and slot 458 may be used with valve ring 450. As described above, pin 457 and slot may be used to maintain valve ring 450 in alignment with opening 28. In addition to alignment, pin 457 and slot 458 may be used as stops or detents to maintain valve ring 450 in open or closed positions.

Referring to FIG. 29, valve ring 450 is moved to an open position such that valve orifice 451 is, at least partially, aligned with opening 28. To prevent valve ring 450 from extending beyond opening 28, pin 457 may encounter the end of slot 458 to form a detent or stop position. In addition to aiding alignment of valve orifice 451 with opening 28, the stop position may further prevent the over-extension of spring 470. Once the actuation of valve ring 450 has ceased, spring 470 biases valve ring 450 to return to closed position as illustrated in FIG. 9. In alternate embodiments, spring 470 may be biased in open position.

Figure 30:
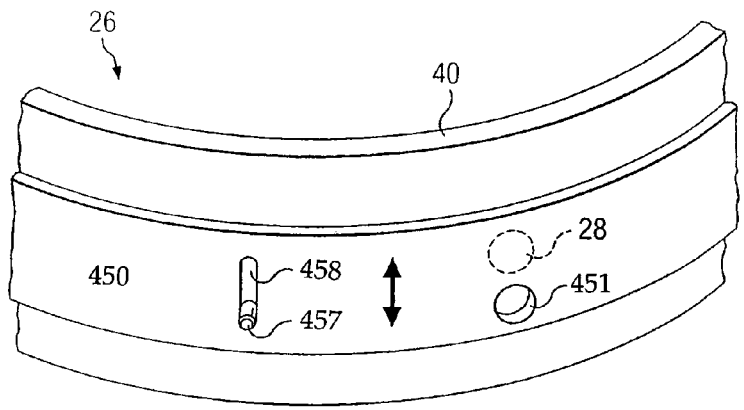
FIG. 30 illustrates an alternative embodiment of the valve ring having a perpendicular range of motion according to the teachings of the present invention.

FIG. 30 illustrates an alternative embodiment of valve ring 450 having a perpendicular range of motion. In some embodiments of the present invention, valve ring 450 may be coupled to fluid separation wall 26 and have a range of motion perpendicular to the rotational motion.

Typically, pin 457 and slot 458 that are used to control the range of motion may be rotated ninety degrees. In this vertical arrangement, slot 458 permits only vertical movement or movements perpendicular to the rotation of fluid separation wall 26. Similarly, pin 457 and slot 458 may be used to guide and maintain alignment of valve ring 450 over opening 28.

Upon activation, valve ring 450 moves up and down, more specifically vertically, along the outer periphery of fluid separation wall 26 (e.g., outer surface 40). By moving between open and closed positions, valve orifice 451 aligns with opening 28 to permit the more dense material to exit opening 28.

Figure 31:
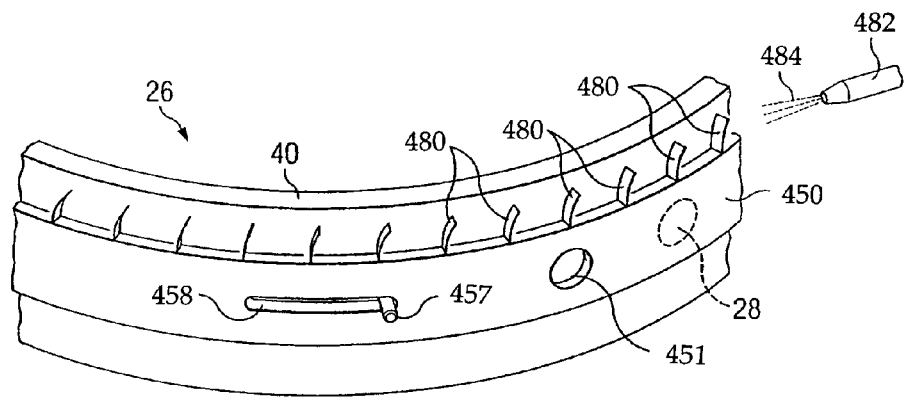
FIG. 31 illustrates an example embodiment of a compressed air control actuator used with the valve ring according to the teachings of the present invention.

FIG. 31 illustrates an example embodiment of a compressed air control actuator used with valve ring 450. Besides solenoid 465 and brake pad 466, valve ring 450 may be actuated using compressed air 484. In some embodiments, compressed air 484 may be directed out of external air nozzle 482 to cause valve ring 450 to move between open and closed positions. In some instances, valve ring 450 may further include vane 480.

One or more vane 480 may be coupled to or formed on valve ring 450. While vane 480 may be added to valve ring 450, vanes 480 are typically formed on valve ring 450 in a manufacturing process such as casting or molding. In some embodiments, vanes 480 project from the surface of valve ring 450 such that they are exposed to compressed air 484 coming from air nozzle 482. Compressed air 484 contacts one or more vanes 480 to move valve ring 450 between open and closed positions.

Figure 32:
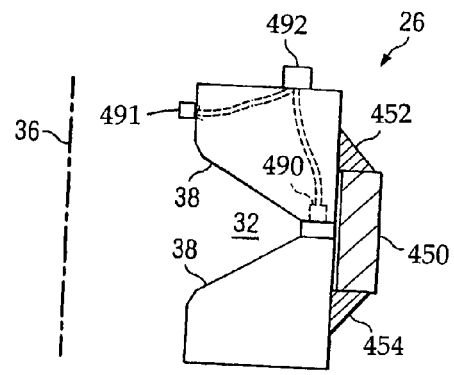
FIG. 32 illustrates a cross-sectional view of fluid separation wall including an example embodiment of a pressure sensor and a particle sensor used to control the actuation of the valve ring according to the teachings of the present invention.

FIG. 32 illustrates a cross-sectional view of fluid separation wall including an example embodiment of pressure sensor 490 and particle sensor 491 used to control the actuation of valve ring 450. As described above, actuation of valve ring 450 may be based on a variety of conditions including an operational parameter. An example of such parameter includes pressure within fluid separation wall 26. As such, pressure sensor 90 may be coupled to an inner surface of fluid separation wall 26 (e.g., inner wall 38) or along a surface of opening 28.

In one example embodiment, pressure sensor 490 is placed along an inner wall of opening 28. As the pressure within opening 28 changes, a signal is sent to actuation controller 492 to cause valve ring 450 to move between open and closed positions.

For example, if valve ring 450 is biased to a closed position, thus blocking the more dense materials within opening 28. The pressure within opening 28 may begin to increase. Upon reaching a predetermined pressure limit, actuation controller 492 causes valve ring 450 to move to a second or "open" position to release the more dense material from opening 28. As the pressure within opening 28 decreases, actuation controller 492 may cause valve ring 450 to return to the biased first or "closed" position.

Centrifuge 10 may cause the actuation of valve ring 450 based on a determination of particle characteristics of the clarified fluid stream. In some embodiments, particle sensor 491 may be coupled to a portion of fluid separation wall 26 such that a portion of the clarified fluid passes over particle sensor 491. Particle sensor 491 may further be in communication with actuation controller 492. Because particle characteristic may indicate operational characteristics of the centrifuge, actuation controller 492 may cause valve ring 450 to actuate based on the particle characteristics reaching a predetermined level.

In other embodiments, actuation controller 492 may receive determinations from both pressure sensor 490 and particle sensor 491 to cause the actuation of valve ring 450.

Although the disclosed embodiments have been described in detail, it should be understood that various changes, substitutions and alterations can be made to the embodiments without departing from their spirit and scope.

What is claimed is:

1. A centrifuge for removing more dense material from a fluid medium, comprising:
a fluid separation wall placed within a sleeve to form a containment zone therebetween, the fluid separation wall having a inner surface, a middle section and an outer surface;
the containment zone operable to receive a portion of the fluid medium having a greater concentration of the more dense material;
the fluid separation wall aligned generally parallel to an axis of rotation and operable to rotate relative to the axis of rotation;
at least one receptacle operable to aid in separation of the more dense material from the fluid medium;
the at least one receptacle defined in a part by a respective geometry operably formed on the inner surface and a respective shape operably formed in the middle section to form a void area between the inner and outer surface;
at least one flow path extending through the fluid separation wall from the void area to the outer surface of the receptacle;
the at least one opening operable to transport the more dense material to the containment zone; and
an excitation apparatus associated with the receptacle, the excitation apparatus operable to create a vibration within the receptacle to cause the more dense fluid to move along the flow path towards the containment zone.

2. The centrifuge of claim 1, further comprising:
a valve ring forming a part of the fluid separation wall, the valve ring including at least one valve orifice formed in the valve ring; and
the valve ring having a first position that blocks the more dense material from exiting the receptacle and a second position that allows the more dense material to exit the fluid separation wall and move into the containment zone.

3. The centrifuge of claim 2, further comprising:
a pin operably engaged with the fluid separation wall, the pin extending radially from the fluid separation wall; and
a slot formed in the valve ring, the slot operably formed to receive the pin therethrough and to guide the valve ring between the first position and the second position such that a valve orifice aligns with the respective opening in the second position.

4. The centrifuge of claim 2, further comprising:
a pin operably engaged with the valve ring, the pin extending radially through the valve ring to engage a slot; and
the slot formed in the fluid separation wall, the slot operably formed to receive the pin and to guide the valve ring between the first position and the second position such that a valve orifice aligns with the respective opening in the second position.

5. The centrifuge of claim 2, further comprising a detent or stop formed in the valve ring, the detent operable to maintain the valve ring in the first position.

6. The centrifuge of claim 2, further comprising;
an upper wedge coupled to the fluid separation wall, the upper wedge operable to restrict the movement of the valve ring; and
a lower wedge coupled to the fluid separation wall, the lower wedge operable to restrict the movement of the valve ring.

7. The centrifuge of claim 2, further comprising an actuator operable to cause the valve ring to move between the first position and the second position.

8. The centrifuge of claim 7, wherein the actuator comprises a brake pad and a solenoid operable to engage a portion of the valve ring to cause the valve ring to move between the first position and the second position.

9. The centrifuge of claim 7, further comprising a controller operable to control the actuation of the actuator.

10. The centrifuge of claim 2, further comprising at least one vane disposed on the valve ring, the at least one vane operable to interact with compressed air to cause the valve ring to move between the first position and the second position.

11. The centrifuge of claim 2, further comprising a spring coupled between an outer section of the fluid separation wall and the valve ring, the spring operable to bias the valve ring toward the first position.

12. The centrifuge of claim 1, further comprising a pressure sensor operably coupled to the fluid separation wall, the pressure sensor operable to determine pressures within the fluid separation wall.

13. The centrifuge of claim 1, wherein the fluid separation wall further comprises a plurality of the receptacles forming a honeycomb pattern on the inner surface.

14. The centrifuge of claim 1, further comprising the respective geometry selected from the group consisting of a triangle, a square, a rectangle, a trapezoid, a diamond, a rhombus, a pentagon, a hexagon, an octagon, a circle, an oval, and a multi-walled shape.

15. The centrifuge of claim 1, further comprising a respective shape selected from the group consisting of pyramidal, triangular, pentagonal, hexagonal, octagonal, trapezoidal, and multi-walled shape.

16. The centrifuge of claim 15, wherein the respective shape further comprises a wall selected from the group consisting of a curved wall, a compound curved wall, a steep sloped wall, a shallow sloped wall, a straight wall, a flat wall, an asymmetric shaped wall, an irregular shaped wall, and any combination thereof.

17. The centrifuge of claim 1, wherein the fluid separation wall comprises:
a modular fluid separation wall defined in part by at least one generally cylindrical disc; and
multiple receptacles formed within the discs.

18. The centrifuge of claim 1, wherein the fluid separation wall comprises:
a modular fluid separation wall defined in part by at least one generally longitudinal wedge; and
multiple receptacles formed within the wedge.

19. The centrifuge of claim 1, further comprising:
an anti-vorticity projection forming a part of the respective shape and extending into the associated void area of the receptacle; and
the anti-vorticity projection operable to create chaos within the void area to prevent the formation of a cyclonic vorticity.

20. The centrifuge of claim 1, further comprising:
an anti-clogging projection formed within the at least one flow path; and
the anti-clogging projection operable to disrupt the formation of a clog within the at least one flow path.

21. The centrifuge of claim 1, further comprising an activation switch operable to activate the excitation device causing the vibration.

22. The centrifuge of claim 1, further comprising a flexible middle layer disposed between the inner surface and the outer surface, the flexible middle layer operable to dampen the vibration from the excitation device.

23. The centrifuge of claim 1, wherein the excitation apparatus comprises an electro-mechanical vibration inducing device.

24. The centrifuge of claim 1, wherein the excitation apparatus comprises an object operable to rotate in a substantially circular pattern to create the vibration.

25. The centrifuge of claim 1, the excitation apparatus comprising:
a projection extending from a center core disposed in the centrifuge; and
the projection operable to extend into the fluid medium placed in the receptacle to impart a vibration into the fluid medium.

26. The centrifuge of claim 1, wherein the excitation device and the opening are formed in part by a vibration inducing nozzle.

27. The centrifuge of claim 1, wherein the excitation device comprises an ultrasonic excitation apparatus operable to apply ultrasonic vibrations to a portion of the flow path.

28. The centrifuge of claim 27, wherein the ultrasonic vibration comprises a frequency greater than approximately 20,000 cycles per second.

29. A centrifuge for removing more dense material from a fluid medium, comprising:
a fluid separation wall placed within a non-rotating sleeve to form a containment zone therebetween;
the containment zone operable to receive a portion of the fluid medium having a greater concentration of the more dense material;
a fluid separation wall aligned generally parallel to an axis of rotation and operable to rotate around the axis of rotation, the fluid separation wall having an inner surface, middle section, and an outer surface;
at least one receptacle formed on the inner surface of the fluid separation wall;
a respective geometry formed on the inner surface for each receptacle;
a receptacle shape formed in the middle section of the at least one receptacle, the at least one receptacle shape in communication with the fluid medium;
the at least one receptacle operable to aid in separation of the more dense material from the fluid medium by forming a void space between the inner surface and the outer surface;
at least one flow path extending through the fluid separation wall from the void space to the outer surface of the at least one receptacle;
the flow path operable to transport the more dense material to the containment zone;
means for vibrating the receptacle such that the more dense material moves toward the flow path to the containment zone; and
means for controlling the flow of more dense material along the flow path towards to containment zone.

30. A centrifuge for removing more dense material from a fluid medium, comprising:
a fluid separation wall placed within a non-rotating sleeve to form a containment zone therebetween;

the containment zone operable to receive a portion of the fluid medium having a greater concentration of the more dense material;

the fluid separation wall aligned generally parallel to an axis of rotation and operable to rotate around the axis of rotation;

a plurality of replaceable receptacles forming a part of the fluid separation wall, the plurality of replaceable receptacles to aid in the separation of more dense material from the fluid medium;

an inner shell forming a part of the replaceable receptacle, the inner shell including a flanged surface and at least one opening, wherein the inner shell is in communication with the fluid medium;

an outer shell segment forming a part of the replaceable receptacle and including a mounting surface, the mounting surface operable to couple to the flanged surface of the inner shell;

at least one flow path extending through the fluid separation wall and out the at least one opening of the inner shell to the containment zone, the flow path operable to transport the more dense material to the containment zone;

a valve ring having at least one orifice and formed over the opening, the valve ring operable to slide along the outer surface of the wall such that the at least one orifice aligns with the opening to allow the more dense material to exit the fluid separation wall and move into the containment zone; and an excitation apparatus associated with the replaceable receptacles, the excitation apparatus operable to create a vibration within the replaceable receptacle.

31. The centrifuge of claim 30 further comprising a shell wall forming a part of the inner shell, the shell wall including a receptacle shape operable to interact with the fluid medium.

* * * * *